US012621120B2

(12) United States Patent
Hoshizuki et al.

(10) Patent No.: US 12,621,120 B2
(45) Date of Patent: May 5, 2026

(54) ENCRYPTION PROCESSING DEVICE AND ENCRYPTION PROCESSING METHOD

(71) Applicant: AXELL CORPORATION, Tokyo (JP)

(72) Inventors: Yusuke Hoshizuki, Tokyo (JP); Kotaro Matsuoka, Tokyo (JP)

(73) Assignee: AXELL CORPORATION, Tokyo (JP)

( * ) Notice: Subject to any disclaimer, the term of this patent is extended or adjusted under 35 U.S.C. 154(b) by 170 days.

(21) Appl. No.: 18/473,876

(22) Filed: Sep. 25, 2023

(65) Prior Publication Data

US 2024/0022395 A1     Jan. 18, 2024

Related U.S. Application Data

(63) Continuation of application No. PCT/JP2022/001829, filed on Jan. 19, 2022.

(30) Foreign Application Priority Data

Mar. 26, 2021     (JP) ................................. 2021-053360
Aug. 12, 2021     (JP) ................................. 2021-131701

(51) Int. Cl.
   *H04L 9/00*          (2022.01)
   *G06F 21/60*         (2013.01)
      (Continued)

(52) U.S. Cl.
   CPC .................................... *H04L 9/008* (2013.01)

(58) Field of Classification Search
   CPC ....... H04L 9/008; H04L 9/3093; G06F 21/60; G09C 1/00
   See application file for complete search history.

(56) References Cited

U.S. PATENT DOCUMENTS 9,313,028 B2 *     4/2016     Tamayo-Rios .......... H04L 9/008
2013/0216044 A1 *     8/2013     Gentry .................... H04L 9/008
                                                           380/277

(Continued)

FOREIGN PATENT DOCUMENTS

CN          111931243 A          11/2020
JP          2019-514301 A          5/2019

OTHER PUBLICATIONS

WIPO, Japan Patent Office as International Search Authority, International Search Report with English Translation and Written Opinion mailed Mar. 22, 2022 in International Patent Application No. PCT/JP2022/001829, 11 pages.

(Continued)

*Primary Examiner* — Vu V Tran
(74) *Attorney, Agent, or Firm* — MASUVALLEY & PARTNERS; Peter Martinez

(57)          ABSTRACT

An operation by a full adder that achieves fully homomorphic encryption is speeded up. Ciphertexts are ciphertexts of fully homomorphic encryption that allow a logical operation to be performed without decryption. A sorting process is performed which rearranges the ciphertexts arranged in a predetermined order in accordance with a predetermined method. In the sorting process, a homomorphic operation based on a first ciphertext and a second ciphertext is performed. From a result of this homomorphic operation and a ciphertext obtained based on a predetermined polynomial, new first and second ciphertexts are calculated. When the first and second ciphertexts and the new first and second ciphertexts satisfy a predetermined condition, the first ciphertext and the second ciphertext are swapped.

8 Claims, 14 Drawing Sheets

(51) Int. Cl.
  *G09C 1/00*   (2006.01)
  *H04L 9/30*   (2006.01)

(56)     References Cited

U.S. PATENT DOCUMENTS

2017/0293913 A1 10/2017 Gulak et al.
2021/0075588 A1* 3/2021 Khedr .................... H04L 9/008

OTHER PUBLICATIONS

Chillotti, Ilaria, et al., "TFHE: Fast Fully Homomorphic Encryption over the Torus," *Journal of Cryptology*, 33:34-91, 2020, 62 pages.

* cited by examiner

| NAME | ADDRESS | AGE |
|---|---|---|
| TARO SUZUKI | CHIYODA WARD | 46 |
| TAKASHI SATO | MINATO WARD | 50 |
| JIRO TANAKA | CHIYODA WARD | 34 |
| KOJI YOSHIKAWA | TAITO WARD | 58 |
| SADAMUNE TAKEDA | MINATO WARD | 43 |

| ADDRESS | TOTAL AGE | NUMBER OF PEOPLE |
|---|---|---|
| CHIYODA WARD | 0 | 0 |
| MINATO WARD | 0 | 0 |
| TAITO WARD | 0 | 0 |

| ADDRESS | TOTAL AGE | NUMBER OF PEOPLE | |
|---|---|---|---|
| CHIYODA WARD | 80 | 2 | (AVERAGE AGE 40) |
| MINATO WARD | 93 | 2 | (AVERAGE AGE 46.5) |
| TAITO WARD | 58 | 1 | (AVERAGE AGE 58) |

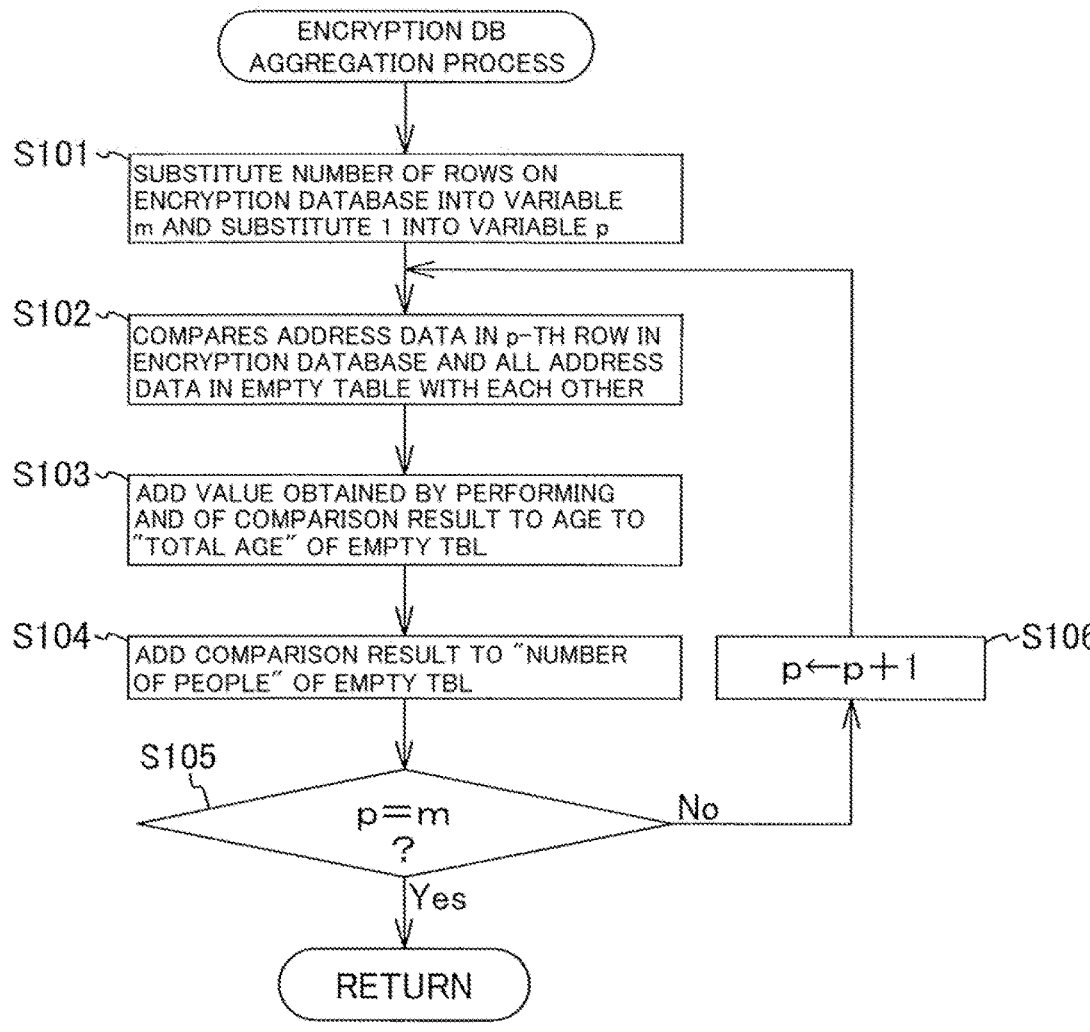

ENCRYPTION DB
AGGREGATION PROCESS

S101 — SUBSTITUTE NUMBER OF ROWS ON
ENCRYPTION DATABASE INTO VARIABLE
m AND SUBSTITUTE 1 INTO VARIABLE p

S102 — COMPARES ADDRESS DATA IN p-TH ROW IN
ENCRYPTION DATABASE AND ALL ADDRESS
DATA IN EMPTY TABLE WITH EACH OTHER

S103 — ADD VALUE OBTAINED BY PERFORMING
AND OF COMPARISON RESULT TO AGE TO
"TOTAL AGE" OF EMPTY TBL

S104 — ADD COMPARISON RESULT TO "NUMBER
OF PEOPLE" OF EMPTY TBL

S106 — p ← p+1

S105 — p = m
?

No

Yes

RETURN

FIG.13

|     | cz  | az  | bz  | tz  | uz  | (0,1/4)−uz+cz | az′ | bz′ |
|-----|-----|-----|-----|-----|-----|---------------|-----|-----|
| (1) | 0   | 0   | 0   | 0   | 3/8 | 7/8           | 0   | 0   |
| (2) | 0   | 0   | 1/4 | 0   | 1/8 | 1/8           | 0   | 1/4 |
| (3) | 0   | 1/4 | 0   | 1/2 | 5/8 | 5/8           | 1/4 | 0   |
| (4) | 0   | 1/4 | 1/4 | 1/2 | 7/8 | 3/8           | 1/4 | 1/4 |
| (5) | 1/4 | 0   | 0   | 1/2 | 5/8 | 7/8           | 0   | 0   |
| (6) | 1/4 | 0   | 1/4 | 1/2 | 7/8 | 5/8           | 1/4 | 0   |
| (7) | 1/4 | 1/4 | 0   | 0   | 3/8 | 1/8           | 0   | 1/4 |
| (8) | 1/4 | 1/4 | 1/4 | 0   | 1/8 | 3/8           | 1/4 | 1/4 |

| ADDRESS | TOTAL AGE | NUMBER OF PEOPLE | |
|---|---|---|---|
| TAITO WARD | 58 | 1 | (AVERAGE AGE 58) |
| MINATO WARD | 93 | 2 | (AVERAGE AGE 46.5) |
| CHIYODA WARD | 80 | 2 | (AVERAGE AGE 40) |

FIG.17

(MODIFICATION)

ENCRYPTION PROCESSING DEVICE AND ENCRYPTION PROCESSING METHOD

CROSS-REFERENCE TO RELATED APPLICATION

This application is a continuation of and claims priority to International Application No. PCT/JP2022/001829 filed on Jan. 19, 2022, entitled Encryption Processing Device, Encryption Processing Method, and Encryption Processing Program, which claims priority to Japanese Application No. 2021-053360 and Japanese Application No. 2021-131701, all of which are incorporated herein by reference in their entireties.

FIELD OF THE INVENTION

The embodiments discussed herein are related to an encryption processing device, an encryption processing method, and an encryption processing program that process a ciphertext.

BACKGROUND OF THE INVENTION

Homomorphic encryption is an encryption technique that can process encrypted data without decrypting the encrypted data. Encryption that allows an operation between ciphertexts, corresponding to addition of plaintexts, to be performed is additive homomorphic encryption, and encryption that allows an operation between ciphertexts, corresponding to multiplication of plaintexts, to be performed is multiplicative homomorphic encryption.

Additive homomorphic encryption and multiplicative homomorphic encryption have been conventionally known in which while a finite cyclic group is regarded as an integer, only an additive operation (addition and subtraction) and a multiplicative operation (multiplication) are performed, respectively.

Since the finite cyclic group can be multiplied by an integer by repeating addition, a "plaintext" can be multiplied by an integer, and the "plaintext" can be exponentiated by repeating multiplication.

There is also known fully homomorphic encryption (FHE) that allows both an additive operation (addition and subtraction) and a multiplicative operation (multiplication) to be performed while ciphertexts remain encrypted.

Fully homomorphic encryption known at present uses somewhat homomorphic encryption, for example, based on the LWE problem, which allows addition/subtraction and multiplication to be performed multiple times. When being based on the LWE problem, somewhat homomorphic encryption is configured by adding a small error to a plaintext in an encryption process to such an extent that there is no problem in decryption. Somewhat homomorphic encryption is not limited to LWE encryption.

In somewhat homomorphic encryption based on the LWE problem, an error is accumulated as an operation is performed, and therefore bootstrapping for reducing an error component is performed while the error component remains encrypted before the error becomes too large to be decrypted.

Such bootstrapping requires an enormous amount of data and an enormous amount of calculation. Therefore, it cannot be said that fully homomorphic encryption has been realized in a practical sense.

A method for drastically improving this problem is TFHE (Fast Fully Homomorphic Encryption over the Torus)

described in "TFHE: Fast Fully Homomorphic Encryption over the Torus. Journal of Cryptology, 33:34-91, 2020, I. Chillotti, N. Gama, M. Georgieva, and M. Izabachene" (referred to as the aforementioned paper in the following descriptions).

Homomorphic encryption including TFHE draws attention also as encryption for implementing an encrypted database in which values or data stored are encrypted.

As described above, homomorphic encryption is an encryption technique that can process encrypted data without decrypting the data, i.e., while the data remains encrypted.

In the encrypted database, indices cannot be created. However, by encrypting not only values on the database but also a query by homomorphic encryption, it is possible to perform an operation such as search without decrypting the values and the query, i.e., concealing the contents.

Another example of the operation for the encrypted database is an operation of aggregating values on the database by category and sorting the aggregation results in ascending order or descending order.

SUMMARY OF THE INVENTION

According to an aspect of the embodiments, an encryption processing device processes a ciphertext, where the ciphertext has two values as a plaintext and is a ciphertext of fully homomorphic encryption that allows a logical operation without decryption, each of the two values being obtained by adding an error having a predetermined variance to a predetermined value corresponding to a symbol 0 or 1, new ciphertexts respectively corresponding to a plaintext of a first ciphertext and a plaintext of a second ciphertext arranged in a predetermined order are able to be obtained in a same order as or in a reverse order to the predetermined order, a process that is able to select an order of the new ciphertexts based on a plaintext of a third ciphertext is performed, and the number of calculations required for the process is reduced by using a multi-value logical operation outputting a temporary ciphertext that is based on the ciphertext and has multiple values more than two values as a plaintext.

The objects and advantages of the invention will be realized and achieved by the elements and combinations specifically pointed out in the claims.

It is to be understood that both the foregoing general description and the following detailed description are exemplary and illustrative and are not intended to limit the invention as claimed.

BRIEF DESCRIPTION OF THE DRAWINGS

FIG. 6 is a diagram illustrating an example of an encrypted database.

FIG. 7 is a diagram illustrating an example of a table as an empty response.

FIG. 8 is a diagram illustrating an example of an aggregation result table.

FIG. 9 is a flowchart for explaining a process flow of aggregation on an encrypted database by an encryption processing device.

FIG. 13 is a diagram illustrating values that a ciphertext can have in a process of conditional swap according to the present embodiment.

FIG. 17 is a more detailed explanatory diagram of an operation process by the encryption processing device according to the modification.

DESCRIPTION OF EMBODIMENTS

An embodiment of the present invention is described below in detail with reference to the drawings.

In the following descriptions, an alphanumeric character sandwiched by [ ] indicates that it is a vector. An alphanumeric character sandwiched by { } indicates that it is a set.

Further, in the present specification, a "logical operation" refers to a binary or multi-value logical operation.

The present embodiment relates to an encryption processing device that performs a manipulation to an encrypted database as described in detail below.

An encryption processing device according to the present embodiment rearranges, on an encrypted database storing encrypted values therein, the results of aggregation based on a specific reference value in ascending order or descending order without decrypting ciphertexts.

When values in such a database are swapped while being encrypted, the values cannot be easily swapped based on the magnitude correlation of the values, unlike swap in a plaintext database or swap of values in the encrypted database after the values are decrypted.

In that case, the encryption processing device performs subtraction between a ciphertext av and a ciphertext bv that are references of conditional swap, thereby obtaining a ciphertext cz, as described below. The ciphertext cz is a borrow bit indicating the magnitude correlation between the ciphertext av and the ciphertext bv.

Figure 1A:
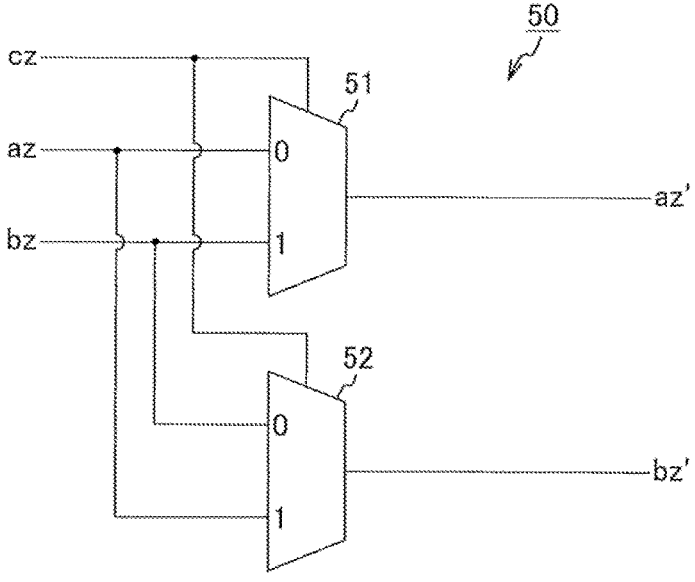
FIGS. 1A and 1B are diagrams illustrating an example of an encryption operation processor for performing conditional swap of ciphertexts.
Figure 1B:
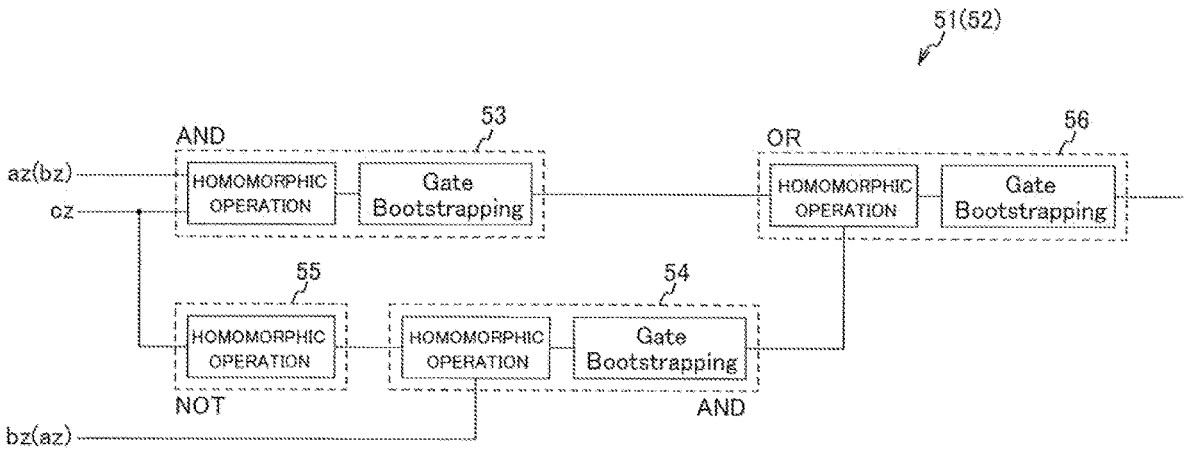

The encryption processing device inputs ciphertexts az and bz respectively corresponding to the ciphertexts av and by that are objects of conditional swap, and the above-described ciphertext cz to an encryption operation processor using multiplexer (MUX) operation units illustrated in FIG. 1, and obtains new ciphertexts az' and bz'. The encryption processing device then replaces the ciphertext az and the ciphertext bz with the ciphertext az' and the ciphertext bz', respectively, to perform swap.

FIG. 1 is a diagram illustrating an example of the encryption operation processor for performing conditional swap of ciphertexts.

Although FIG. 1 illustrates the encryption operation processor as a hardware circuit configured by logical operation elements, the encryption operation processor may be considered as a software-implemented swap program to be executed by CPU.

When the encryption operation processor is implemented by software, an operation is performed with a concept of designing a logic circuit (a logic gate) for a ciphertext.

As illustrated in FIG. 1(*a*), an encryption operation processor 50 includes two MUX operation units 51 and 52.

The MUX operation units 51 and 52 each performs a logical operation that selects either of the two ciphertexts az and bz by the one ciphertext cz.

The ciphertexts az, bz, and cz are input to the first MUX operation unit 51 and the second MUX operation unit 52.

As for the first MUX operation unit 51, the ciphertext az is input to the input 0, the ciphertext bz is input to the input 1, and the ciphertext az' is obtained as its output.

As for the second MUX operation unit 52, the ciphertext bz is input to the input 0, the ciphertext az is input to the input 1, and the ciphertext bz' is obtained as its output.

With these operations, when the ciphertext cz is bit "0", the order of the ciphertext az' and the ciphertext bz' becomes the same order of the ciphertext az and the ciphertext bz. When the ciphertext cz is bit "1", the order of the ciphertext az' and the ciphertext bz' is swapped, so that the ciphertext bz and the ciphertext az are output in this order.

One multiplexer is configured by two AND circuit units 53 and 54, one NOT circuit unit 55, and one OR circuit unit 56, as illustrated in FIG. 1(*b*).

Each of the first AND circuit unit 53 and the second AND circuit unit 54 is an arithmetic processing unit for obtaining AND.

The NOT circuit unit 55 is an arithmetic processing unit for obtaining NOT.

The OR circuit unit 56 is an arithmetic processing unit for obtaining OR.

The two multiplexers in FIG. 1 have the same configuration as each other.

In the MUX operation unit 51, the ciphertext az and the ciphertext cz are input to the first AND circuit unit 53.

The ciphertext cz is also input to the NOT circuit unit 55, and its output and the ciphertext bz are input to the second AND circuit unit 54.

The output of the first AND circuit unit 53 and the output of the second AND circuit unit 54 are input to the OR circuit unit 56, and the output of the OR circuit unit 56 is output as the output of the multiplexer.

In the MUX operation unit 52, the ciphertext bz and the ciphertext cz are input to the first AND circuit unit 53.

The ciphertext cz is also input to the NOT circuit unit 55, and its output and the ciphertext az are input to the second AND circuit unit 54.

The output of the first AND circuit unit 53 and the output of the second AND circuit unit 54 are input to the OR circuit unit 56, and the output of the OR circuit unit 56 is output as the output of the multiplexer.

With the configuration described above, the MUX operation units 51 and 52 perform a logical operation of (cz AND az) OR ((NOT cz) AND bz) and a logical operation (cz AND bz) OR ((NOT cz) AND az), respectively.

The MUX operation units 51 and 52 each includes two AND circuit units, one OR circuit unit, and one NOT circuit unit, that is, includes four logical operation elements (processing units corresponding to the logical operation elements). Therefore, one operation by a multiplexer requires the operation time for four logical operation elements. In a case of using such a multiplexer for an operation of fully homomorphic encryption by TFHE, Gate Bootstrapping has to be performed in the latter stage of an operation (a homomorphic operation) in each of the logical operation elements (the AND circuit units and the OR circuit unit). The NOT circuit unit 55 does not require Gate Bootstrapping. Therefore, Gate Bootstrapping is performed three times in the two AND circuit units 53 and 54 and the one OR circuit unit 55 in each of the MUX operation units 51 and 52.

In one operation processing that performs an operation of a new ciphertext in conditional swap processing, processing by the MUX operation unit 51 is performed, and processing by the MUX operation unit 52 is performed for another new ciphertext. As described above, it is necessary to perform Gate Bootstrapping three times by each of the MUX operation units 51 and 52. Therefore, an operation of fully homomorphic encryption by the encryption operation processor 50 in FIG. 1 requires a lot of operation time of Gate Bootstrapping, and it cannot be said that an encrypted database is operated practically.

To solve this problem, the aforementioned paper has proposed a method called HomMUX using and improving the configuration in FIG. 1. This method is the same as the above-described method in that an operation by a multiplexer in THFE (HomMUX) is performed twice in one comparison.

Since it takes the same processing time as that in a case of performing Gate Bootstrapping twice in one MUX operation, a calculation time for four times of BlindRotate (corresponding to four gates) is required for performing the MUX operation twice. Also in this case, to perform all necessary sorting requires enormous processing time.

The encryption processing device according to the present embodiment reduces a processing time required for an operation on such an encrypted database to make the encrypted database practical.

Before the operation on the encrypted database is described, an operation of fully homomorphic encryption performed by the encryption processing device according to the present embodiment is described.

Figure 2:
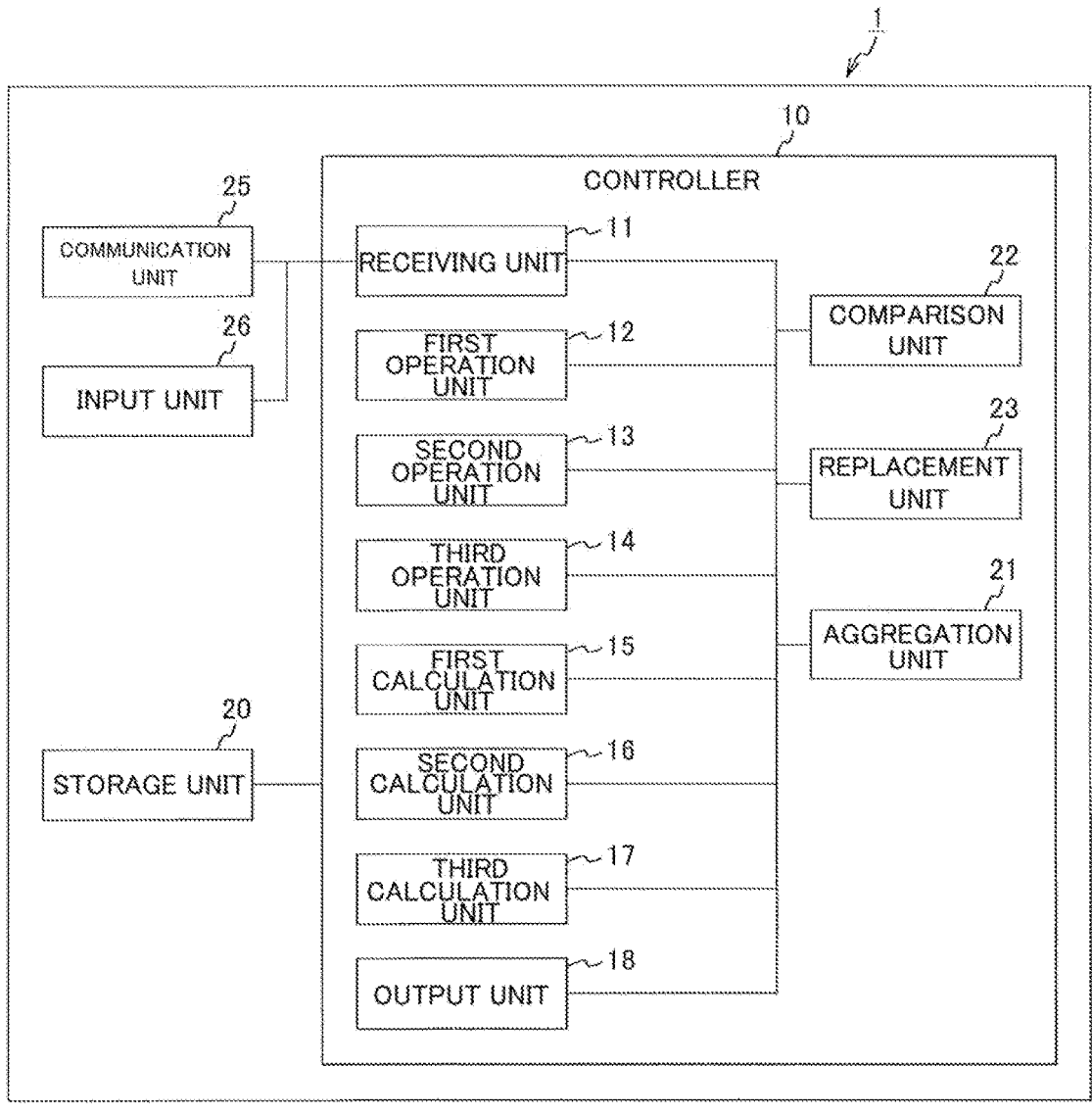
FIG. 2 is an explanatory diagram of a functional configuration of an encryption processing device according to the present embodiment.

FIG. 2 is an explanatory diagram of a functional configuration of the encryption processing device according to the present embodiment.

An encryption processing device 1 includes a controller 10, a storage unit 20, a communication unit 25, and an input unit 26.

The controller 10 includes a receiving unit 11, a first operation unit 12, a second operation unit 13, a third operation unit 14, a first Bootstrapping unit (a first calculation unit) 15, a second Bootstrapping unit (a second calculation unit) 16, a third Bootstrapping unit (a third calculation unit) 17, and an output unit 18.

The controller 10 also includes an aggregation unit 21, a comparison unit 22, and a replacement unit 23.

The receiving unit 11 receives input of a ciphertext that is an object of an operation, via the communication unit 25 or the input unit 26. Alternatively, the receiving unit 11 receives input of a ciphertext from another process performed by the encryption processing device 1.

The first operation unit 12 performs a first homomorphic operation for the input ciphertext received by the receiving unit 11.

The second operation unit 13 performs a second homomorphic operation for a ciphertext output from the first Bootstrapping unit 15.

The third operation unit 14 performs a third homomorphic operation for a ciphertext output from the second Bootstrapping unit 16.

The first, second, and third operation units 12, 13, and 14 are arithmetic processing units each of which implements a homomorphic operation for aggregate and swap operations on the encrypted database, which will be described below, by software. At least one of the first, second, and third operation units 12, 13, and 14 may be implemented by hardware.

The first Bootstrapping unit 15 performs a Gate Bootstrapping process, which will be descried below, for the result of the operation by the first operation unit 12 and outputs a new ciphertext.

The second Bootstrapping unit 16 performs a Gate Bootstrapping process, which will be descried below, for the result of the operation by the second operation unit 13 and outputs a new ciphertext.

The third Bootstrapping unit 17 performs a Gate Bootstrapping process, which will be descried below, for the result of the operation by the third operation unit 14 and outputs a new ciphertext.

The aggregation unit 21 performs processing for performing aggregation on an encrypted database.

The comparison unit 22 compares ciphertexts adjacent to each other for sorting (conditional swap) of the aggregation results.

The replacement unit 23 replaces an original ciphertext with the new ciphertext obtained by processing by the first to third operation units 12 to 14 and the first to three calculation units 15 to 17 based on the comparison result by the comparison unit 22 in order to sort the aggregation results in the encrypted database.

The output unit 18 outputs a final operation result to outside of the encryption processing device 1 or to another processing process performed in the encryption processing device 1.

The storage unit 20 can store therein an input ciphertext, a temporary file and temporary data used in an operation of conditional swap, and an output ciphertext.

An encrypted database 60 can also be stored in the storage unit 20.

The communication unit 25 connects the encryption processing device 1 to a network, thereby enabling communication between the encryption processing device 1 and an external device.

The encryption processing device 1 can serve as a database server by storing the encrypted database 60 in the storage unit 20 and including the communication unit 25.

In this case, the encryption processing device 1 can receive an encrypted query from a terminal device as the external device, perform a search on the encrypted database 60, and send an encrypted search result to the terminal device.

The input unit 26 inputs a ciphertext that is an object of arithmetic processing and a query to the encrypted database 60, to the encryption processing device 1.

Figure 3:
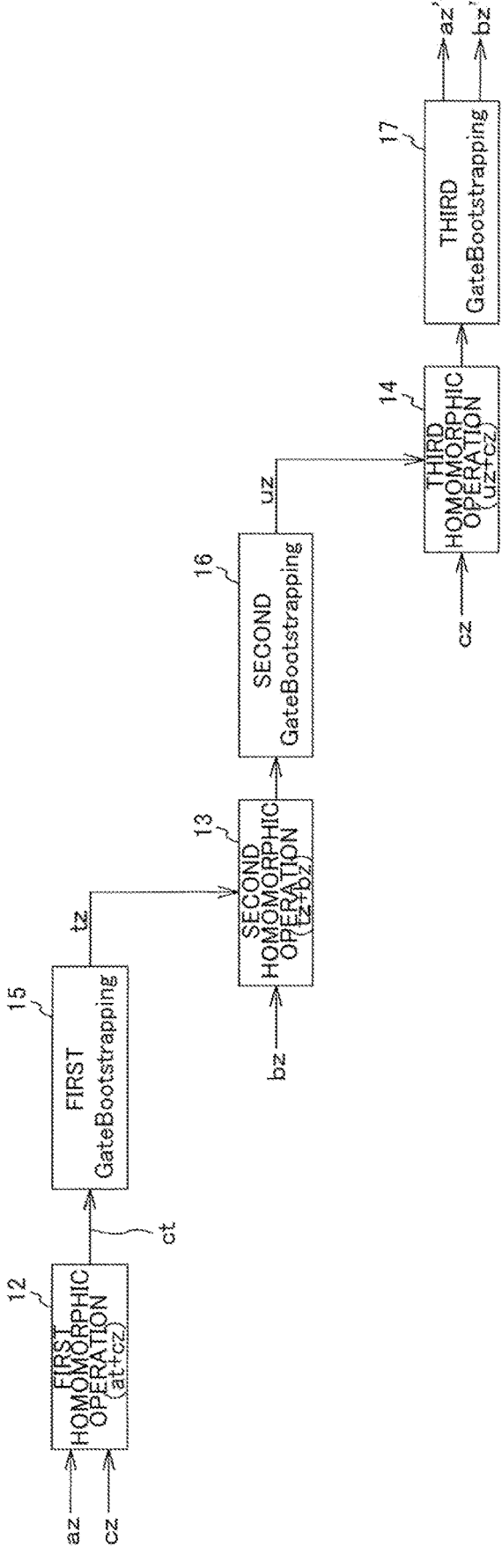
FIG. 3 is a more detailed explanatory diagram of an operation process by the encryption processing device according to the present embodiment.

FIG. 3 is a more detailed explanatory diagram of an operation process by the encryption processing device according to the present embodiment.

In the description of FIG. 3, all of the ciphertexts az, bz, and cz input to the encryption processing device 1 are the TLWE ciphertexts described in the aforementioned paper. TLWE encryption is Bit-wise type fully homomorphic encryption that has 0 or a value $\mu$ (non-0) as a plaintext.

Various operations can be performed by logical operations using logic gates.

Further, as described later, a TLWE ciphertext has two values as a plaintext, each value being obtained by adding an error with a predetermined variance to a predetermined value corresponding to a binary symbol 0 or 1. The TLWE ciphertext can be subjected to a logical operation without being decrypted.

The configuration illustrated in FIG. 3 uses (binary) Gate Bootstrapping presented in "TFHE: Fast Fully Homomorphic Encryption over the Torus. Journal of Cryptology, 33:34-91, 2020, I. Chillotti, N. Gama, M. Georgieva, and M. Izabachene" (the aforementioned paper).

Gate Bootstrapping in TFHE presented in the aforementioned paper will be described in detail below.

The input ciphertexts az and cz are input to the first operation unit 12 and are subjected to a homomorphic operation (ciphertexts az+cz−(0. ⅛⅛), and a ciphertext ct that is the operation result is input to the first Bootstrapping unit 15 that performs binary Gate Bootstrapping.

The output of the first Bootstrapping unit 15 is a temporary ciphertext tz that can have either one of two values (0, $\mu$) as a plaintext.

The ciphertext tz and the ciphertext bz are input to the second operation unit 13 and subjected to a homomorphic operation (tz+bz−(0. ⅛), and its output result is input to the second calculation unit 16 and subjected to binary Gate Bootstrapping. Consequently, a temporary ciphertext uz is output.

The ciphertext uz and the ciphertext cz are input to the third operation unit 14 and subjected to a homomorphic operation ((0, ¼)−uz+cz), and its output result is input to the third calculation unit and subjected to binary Gate Bootstrapping. Consequently, a new ciphertext az' and a new ciphertext bz' are output.

A time required for the homomorphic operation by the first operation unit 12, a time required for the homomorphic operation by the second operation unit 13, and a time required for the homomorphic operation by the third operation unit 14 are very short. Gate Bootstrapping consumes almost all the processing time when an MUX operation is processed by using a homomorphic operation.

In a case of performing an operation of a full adder by using binary Gate Bootstrapping as in the encryption processing device 50 illustrated in FIG. 1, it is necessary to carry out Gate Bootstrapping three times in the latter stage in each of the AND circuit units 53 and 54 and the OR circuit unit 56 in each of the MUX operation units 51 and 52, i.e., six times in total. By causing the AND circuit units 53 and 54 to operate in parallel, one MUX operation unit can perform the entire processing by processing for two gates (the number of stages of Bootstrapping is two). Therefore, the entire processing by the MUX operation units 51 and 52 can be performed by processing for four gates (the number of stages of Bootstrapping is two).

Gate Bootstrapping explained in TFHE is described in detail.

Gate Bootstrapping is a method for making fully homomorphic encryption, which has not been practical because of a huge amount of data and its operation time, practical.

TFHE in the aforementioned paper uses encryption in which LWE (Learning with Errors) encryption is configured over a circle group, so called "TLWE encryption", and achieves various types of homomorphic logical operations (and furthermore any operation such as addition and multiplication) between TLWE ciphertexts at high speed with small data size while making an error in an operation small.

An input of Gate Bootstrapping in TFHE is a TLWE ciphertext encrypted with a private key.

TFHE achieves fully homomorphic encryption (FHE) based on TLWE ciphertexts.

TLWE encryption is a unique case of LWE encryption (obtained by defining LWE encryption over a circle group) that is one type of lattice-based cryptography.

TLWE encryption is additively homomorphic and is known as being able to perform an additive operation between plaintexts encrypted by TLWE encryption without decrypting ciphertexts.

Figure 4:
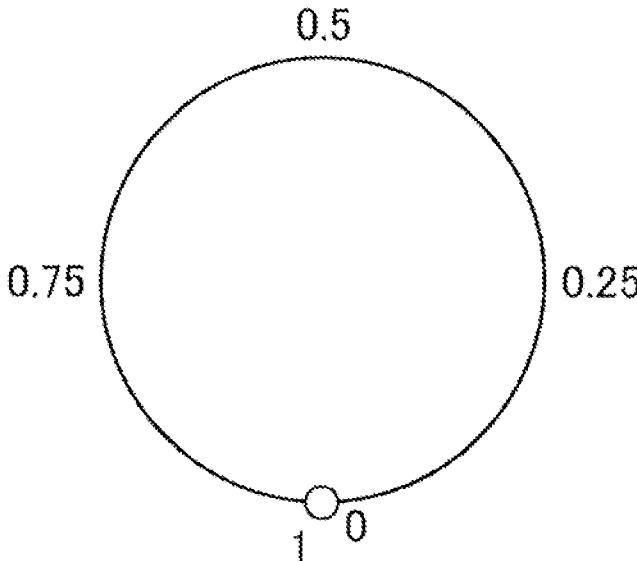
FIG. 4 is an image diagram for explaining a circle group that TLWE encryption has as a plaintext.

FIG. 4 is an image diagram for explaining a circle group that TLWE encryption has as a plaintext.

TLWE encryption has a real number $\mu$ as a plaintext corresponding to 0 on a circle group $\{T\}$ illustrated in FIG. 4 or any point (not 0) other than 0 on the circle group $\{T\}$, the circle group $\{T\}$ moving from 0 to 1 with a real number precision and, when reaching 1, returns to 0. TLWE encryption itself has any point as a plaintext, and uses a range near 0 (including an error) and a range near $\mu$ (including an error) as a plaintext.

The point on the circle group $\{T\}$ is also described as an "element" in the present specification.

An encryption processing device handling TFHE performs a generic homomorphic operation, for example, an additive operation as an operation between such TLWE ciphertexts, and makes an error of the operation result fall within an appropriate range by Gate Bootstrapping, thereby achieving fully homomorphic encryption (FHE) that allows a logical operation to be performed again (in the latter stage).

[TLWE Encryption]

TLWE encryption is described.

A vector [a] in which N random numbers are collected to be uniformly distributed is prepared as an element on the circle group $\{T\}$. In addition, a private key vector [s] in which N values each being 0 or 1 are collected at random is prepared.

Assuming that a random number in the Gaussian distribution (the normal distribution) in which an average value is a plaintext $\mu$ and a variance is preset to $\alpha$ is e, an example of a TLWE ciphertext is a pair ([a], [s]·[a]+e).

An average value of e when an infinite number of TLWE ciphertexts are created for the same plaintext $\mu$ is a plaintext $\mu$, where $\mu$ is a plaintext without an error and e is a plaintext with an error.

Symbol "·" represents a dot product of vectors. This description is also applied to the following descriptions.

When [s]·[a]+e described above is written as b, the TLWE ciphertext can be represented as ([a], b).

A function $\varphi_s(([a], b)=b−[s]\cdot[a]=e$ is a function of decrypting the TLWE ciphertext. Since TLWE encryption adds a dot product of a private key vector and a random number vector and an error to a plaintext to encrypt the plaintext, TLWE encryption can be decrypted with the error by calculating the dot product of the private key vector and the random number vector. At this time, if the private key vector is unknown, a component serving as the dot product cannot be calculated, and therefore decryption cannot be performed.

This TLWE encryption is additively homomorphic and allows an additive operation between plaintexts of TLWE ciphertexts to be performed without decrypting the ciphertexts.

When ([a]+[a'], b+b') obtained by adding two TLWE ciphertexts ([a], b) and ([a'], b') together as they are is input to the aforementioned decryption function $\varphi_s$, a sum of the two plaintexts is obtained as represented by $\varphi_s$(([a]+[a'], b+b'))=(b+b')−[s]·([a]+[a'])=(b−[s]·[a])+(b'−[s]·[a'])=$\varphi_s$([a], b)+($\varphi_s$([a'], b'). It is thus found that a TLWE ciphertext is a ciphertext obtained by "additive homomorphic encryption".

In TFHE in the aforementioned paper, various operations are achieved by repeating performing an additive operation for TLWE ciphertexts each obtained by adding an error to a plaintext and reducing an error by Gate Bootstrapping.

In the following descriptions, a trivial ciphertext such as ([0], μ) is a TLWE ciphertext that can be decrypted with any private key, that is, a ciphertext that can be decrypted with any private key to provide the same plaintext.

In ([0], μ), [0] represents a zero vector.

Although the trivial ciphertext can be handled as a TLWE ciphertext, it can be considered as a state where a plaintext is placed in the ciphertext substantially as it is.

When the decryption function $\varphi_s$ is applied to the TLWE ciphertext ([0], μ), the private key [s] is multiplied by the zero vector [0] to disappear as represented by $\varphi_s$(([0], μ))=μ−[s]·0=μ. The plaintext μ is thus obtained easily. Such a ciphertext is a trivial ciphertext with regard to the plaintext μ.

A "finite cyclic group" used in Gate Bootstrapping in TFHE is described.

Gate Bootstrapping uses the property of a factor ring of a polynomial ring as a "finite cyclic group".

The following description explains that a "factor ring of a polynomial ring" is a finite cyclic group.

An n-th order polynomial is generally represented by $a_n X^n + a_{n-1} X^{n-1} + \ldots + a_0$.

These all sets form a commutative group for the sum f(x)+g(x) of polynomials.

Further, the product f(x)g(x) of polynomials has properties identical to those of the commutative group except that an inverse element is not necessarily present. Such a structure is called "monoid".

Regarding the sum and the product of polynomials, the distributive property is established as follows.

$$f(x)\{g(x) + g'(x)\} = f(x)g(x) + f(x)g'(x)$$

Therefore, when the sum and the product of polynomials are defined by regarding polynomials as elements, a "ring" is formed, which is called a polynomial ring.

TFHE uses a polynomial ring including the circle group {T} being a finite cyclic group as coefficients, and such a polynomial ring is represented as T[X].

When a polynomial T(X), which is a polynomial ring, is decomposed into $T[X](X^n+1)+T[X]$, and only the remainders are extracted and collected, a "factor ring of a polynomial ring" is obtained because the remainders also is a "ring".

In TFHE, the "factor ring of a polynomial ring" is represented as $T[X]/(X^n+1)$.

A polynomial $F(X)=\mu X^{n-1}+\mu X^{n-2}+ \ldots +\mu X+\mu$ is extracted by using a desired coefficient μ (μ belongs to T) as an element of the "factor ring of the polynomial ring" $T[X]/(X^n+1)$.

When the element F(X) of the "factor ring of the polynomial ring" is multiplied by X, $\mu X^{n-1}+\mu X^{n-2}+ \ldots +\mu X-\mu$ is obtained, the coefficient of the top term appears as a constant term with a sign reversed from positive to negative.

When multiplication by X is further performed, the same phenomenon happens again as represented by $\mu X^{n-1}+\mu X^{n-2}+ \ldots +\mu X^2-\mu X-\mu$ (the coefficient of the top term appears as a constant term with a sign reversed from positive to negative).

When this multiplication is repeated n times, $-\mu X^{n-1}+\mu X^{n-2} \ldots -\mu X-\mu$ is obtained, so that the coefficients of all terms become negative.

When multiplication by X is further continued, the coefficient of the top term becomes positive from negative and appears as a constant term as represented by $-\mu X^{n-1}-\mu X^{n-2} \ldots -\mu X+\mu,$ $-\mu X^{n-1}-\mu X^{n-2} \ldots +\mu X+\mu,$ When multiplication by X is repeated 2n times in total, the multiplication result returns to the original element of the factor ring of the polynomial ring $F(X)=\mu X^{n-1}+\mu X^{n-2}+ \ldots +\mu X+\mu$. As described above, the highest-order coefficient (μ) appears as the lowest-order constant term with a reversed sign (−μ), and terms are shifted by one in whole.

That is, the polynomial $F(X)=\mu X^{n-1}+\mu X^{n-2}+ \ldots +\mu X+\mu$ is a finite cyclic group of order 2n in a ring that is the "factor ring of the polynomial ring" $T[X]/(X^n+1)$.

In TFHE, an encryption processing device achieves fully homomorphic encryption by using such properties of the polynomial F(X) based on a "factor ring of a polynomial ring".

[TRLWE Encryption]

Gate Bootstrapping uses encryption called "TRLWE encryption" in addition to TLWE encryption.

TRLWE encryption is described.

The character "R" in TRLWE encryption means a "ring", and TRLWE encryption is LWE encryption configured by a "ring". TRLWE is also additive homomorphic encryption, as TLWE encryption is.

A "ring" in TRLWE encryption is the "factor ring of the polynomial ring" $T[X]/(X^n+1)$ described above.

In order to obtain TRLWE encryption, elements of the "factor ring of the polynomial ring" $T[X]/(X^n+1)$ are selected at random.

In fact, n coefficients in an (n−1) th order polynomial are selected as uniformly distributed random numbers from the circle group {T}.

When the order of the polynomial is n−1, the polynomial is not divided by $X^n$ +1, and it is not necessary to consider a remainder. Therefore, it is assumed that the (n−1) th order polynomial is a polynomial a(X).

A polynomial s(X) used as a private key is structured as follows, by selecting n values each being 0 or 1 at random.

$$s(X) = s_{n-1}X^{n-1} + s_{n-2}X^{n-2} + \ldots s_1 X + s_0$$

Assuming that n random numbers $e_i$ are random numbers in the Gaussian distribution (the normal distribution) in which an average value is a plaintext $\mu_i$ and a variance is α, the following polynomial e(X) is structured from these random numbers.

$$e(X) = e_{n-1}X^{n-1} + e_{n-2}X^{n-2} + \ldots e_1X + e_0 \qquad (5)$$

Decomposition of s(X)·a(X)+e(X) into f(X)(X$^n$+1)+b(X), and b(X) is obtained.

Consequently, (a(X), b(X)) is obtained as a TRLWE ciphertext.

In TRLWE encryption, since encryption is performed using random numbers similarly to TLWE encryption, innumerable ciphertexts can correspond to the same private key and the same plaintext.

In addition, in TRLWE encryption, g(X) determined in such a manner that $\varphi_s$ becomes an element of T[X]/(X$^n$+1) serves as a decryption function, where $\varphi_s$((a(X), b(X))=b(X)−s(X)·a(X)+g(X)(X$^n$+1), as in TLWE encryption.

[Gadget Decomposition]

Gadget Decomposition is described.

A coefficient in a polynomial used in a TRLWE ciphertext is a real number that is an element of the circle group {T} in FIG. 4 and is equal to or larger than 0 and less than 1, and only has a fractional part.

An operation of decomposing this coefficient into several bits in binary notation is defined as Gadget Decomposition (Dec) in TFHE in the aforementioned paper.

For example, assuming that the degree n of the polynomial F(X) of a TRLWE ciphertext is 2, one unit of decomposition is Bg=2$^2$, and decomposition into l=3 elements is performed. At this time, each element is arranged to enter between −Bg/2 and Bg/2.

A TRLWE ciphertext is a combination of two polynomials like (a(X), b(X)) as described above. Therefore, a TRLWE ciphertext d can be written as $$d = [0.75X^2 + 0.125X + 0.5, \, 0.25X^2 + 0.5X + 0.375]$$

by being regarded as a two-dimensional vector having polynomials that serve as elements of a factor ring of a polynomial ring, as elements. Accordingly, in the following descriptions, each element is decomposed into the form of a sum of powers of Bg$^{-1}$=0.25.

Since 0.75=−0.25 is established on the circle group {T}, decomposition can be performed as follows.

$$d = [0.75X^2 + 0.125X + 0.5, \, 0.25X^2 + 0.5X + 0.375]$$
$$= [-0.25X^2 + 0.125X + 0.5, \, 0.25X^2 + 0.5X + 0.25 + 0.125]$$
$$= [0.25 \times (-X^2 + 2) + 0.25^2 \times 2X + 0.25^3 \times 0, \, 0.25 \times (X^2 + 2X + 1) + 0.25X^2 \times 2 + 0.25^3 \times 0]$$

Therefore, when Gadget Decomposition is performed, a vector $$Dec(d) = [-X^2 + 2, \, 2X, \, 0, \, X^2 + 2X + 1, \, 2, \, 0]$$

is obtained.

An operator H of an inverse transform from a vector to a ciphertext is also defined.

When the description is provided based on the example described above, a matrix $$H = \begin{pmatrix} 0.25 & 0 \\ 0.25^2 & 0 \\ 0.25^3 & 0 \\ 0 & 0.25 \\ 0 & 0.25^2 \\ 0 & 0.25^3 \end{pmatrix}$$

becomes the operator H of the inverse transform. A TRLWE ciphertext d is obtained by performing an operation Dec(d)·H. The lower bits are rounded off.

It can also be said that an operation of obtaining [v] that makes ∥d−[v]·H∥ minimum with respect to the TRLWE ciphertext d is Gadget Decomposition. Here, ∥ is a vector norm (length).

Ciphertexts Zi=(a(X), b(X)) made of polynomials in which all coefficients of e(X) are generated by random numbers having an average value of 0 and a variance of α are created. The number of the created ciphertexts being 2l.

The plaintext μ is encrypted in the following manner, whereby the following ciphertext k is obtained.

$$k = \begin{pmatrix} Z_1 \\ Z_2 \\ \vdots \\ Z_{2\ell} \end{pmatrix} + \mu \times H$$

This ciphertext k is defined as a TRGSW ciphertext.

The TRGSW ciphertext configures a Bootstrapping Key used below.

The Bootstrapping Key is described.

The Bootstrapping Key is for encrypting a private key in order to use the private key in Gate Bootstrapping.

Separately from the private key [s] (Nth order) used for TLWE ciphertexts, each element of a private key [s'] for encrypting the private key [s] is selected to be either of two values, i.e., 0 or 1 for use in Gate Bootstrapping.

It is necessary to make the order of the private key [s'] the same as the order n of a polynomial used in TRLWE encryption.

A TRGSW BK ciphertext is created for each element of the private key [s].

When decryption with the private key [s'] is performed, 2l TRLWE ciphertexts Zj are created where $\varphi_{s'}$(Zj)=0 is satisfied.

Then, BKi is defined as $$BK_i = \begin{pmatrix} Z_1 \\ Z_2 \\ \vdots \\ Z_{2\ell} \end{pmatrix} + s_i \cdot H$$

as in the above-described configuration of the TRGSW ciphertext.

A set of TRGSW ciphertexts formed by using different Zj for respective elements of the private key [s] is referred to as a Bootstrapping Key.

The cross product of the TRGSW ciphertext BKi and the TRLWE ciphertext d is defined as $$BKi \times d = Dec(d) \cdot BKi.$$

Gadget Decomposition is an operation of obtaining [v] that makes $\|d - [v] \cdot H\|$ minimum with respect to the TRLWE ciphertext d.

Therefore, by using $[v] = Dec(d)$ and an error $(\varepsilon_a(X), \varepsilon_b(X))$, $[v] \cdot H = d + (\varepsilon_a(X), \varepsilon_b(X))$ can be written.

As a result, $BKi \times d = Dec(d) \cdot BKi$ $$= \vec{v} \cdot \begin{pmatrix} Z_1 \\ Z_2 \\ \vdots \\ Z_{2\ell} \end{pmatrix} + s_i \times \vec{v} \cdot H$$

is obtained.

When the left side calculates the dot product, and $[v] \cdot H = d + (\varepsilon_a(X), \varepsilon_b(X))$ is substituted into the right side, $$= \sum_{j=1}^{2\ell} v_j \times Z_j + s_i \times (d + (\epsilon_a(X), \epsilon_b(X)))$$

$$= \sum_{j=1}^{2\ell} v_j \times Z_j + s_i \times d + s_i \times (\epsilon_a(X), \epsilon_b(X))$$

is obtained, and becomes the same as calculation of the sum of the following three ciphertexts c1, c2, and c3.

$$c_1 = \sum_{j=1}^{2\ell} v_j \times Z_j$$

$$c_2 = s_i \times d$$

$$c_3 = s_i \times (\epsilon_a(X), \epsilon_b(X))$$

Since TRLWE encryption is additive homomorphic encryption, calculating the sum of ciphertexts is the same as calculating the sum of plaintexts.

Since $c_1$ is obtained by adding several times of $Z_j$, expected values of the plaintext polynomial $\varphi_s(c_1)$ are all 0.

In addition, $\varphi_s(c_3)$ obtained by decryption is set to be sufficiently small also in the subsequent operations, because the magnitude of an absolute value of each coefficient of a plaintext can be adjusted by a system parameter.

In this case, $\varphi_s(BK_i \times d) = \varphi_s(s_i \times d)$ is obtained, but the calculation result is the sum of the above three ciphertexts c1, c2, and c3 regardless of whether $s_i$ is 0 or 1. Whether $s_i$ is 0 or 1 cannot be determined by a simple comparison.

Assuming that there are TRLWE ciphertexts $d_0$ and $d_1$ respectively corresponding to two plaintexts $\mu_0$ and $\mu_1$, when $d = _1 - _0$ is substituted, and $d_0$ is finally added, the following CMux function is completed.

$$CMux(BK_i, d_0, d_1) = BKi \times (d_1 - d_0) + d_0 = Dec(d_1 - d_0) \cdot BK_i + d_0$$

The CMux function outputs a ciphertext of the plaintext to without decrypting it when $s_i$ is 0, and outputs a ciphertext of the plaintext $\mu_1$ without decrypting it when $s_i$ is 1.

Although the CMux function can calculate the ciphertext of the plaintext $\mu_0$ or the plaintext $\mu_1$, it is not possible to know which one is selected.

Binary Gate Bootstrapping in TFHE is performed using various information described above.

Binary Gate Bootstrapping is configured by three steps described below, i.e., (1) BlindRotate, (2) SampleExtract, and (3) Public Key Switching.

Figure 5:
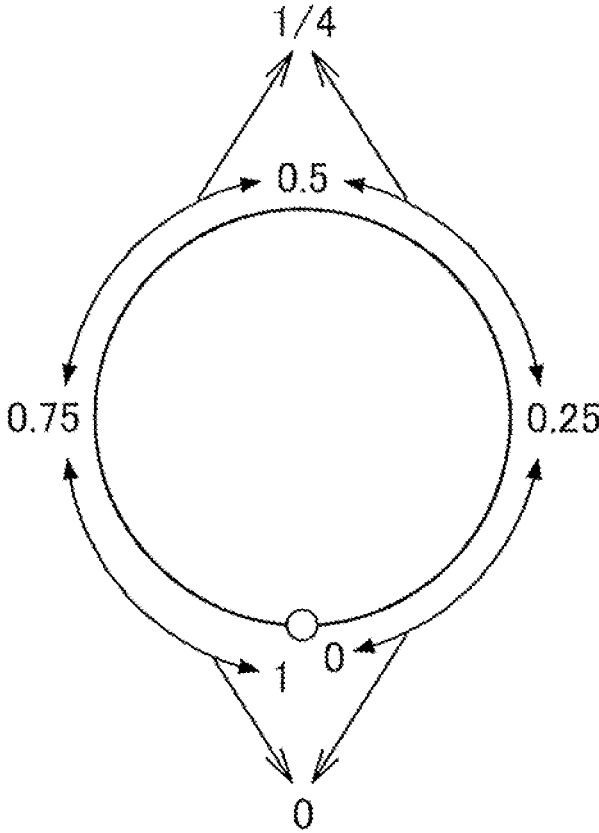
FIG. 5 is an operation image diagram of binary Gate Bootstrapping.

FIG. 5 is an operation image diagram of binary Gate Bootstrapping.

Binary Gate Bootstrapping reduces an error for a plaintext included in a result of a homomorphic operation between TLWE ciphertexts by three steps descried below.

In the following descriptions, unless otherwise specified, a "plaintext" means a result of an operation between plaintexts obtained as a result of an operation between TLWE ciphertexts.

A plaintext in a section from 0 to 0.25 ($\frac{1}{4}$) or 0.75 ($\frac{3}{4}$) to 1 on the circle group {T} in FIG. 4 is converted to a TLWE ciphertext 0, and a plaintext in a section from 0.25 ($\frac{1}{4}$) to 0.75 ($\frac{3}{4}$) is converted to a ciphertext 0.25 ($\frac{1}{4}$).

An error added to the plaintext in this conversion is any error in a range of $\pm\frac{1}{16}$.

(1) BlindRotate

BlindRotate is performed as the first step of Gate Bootstrapping.

BlindRotate is a process of creating a TRLWE ciphertext.

In BlindRotate, from a trivial TRLWE ciphertext (0, T(X)) whose plaintext is a polynomial T(X), a TRLWE ciphertext multiplied by $X^{-\varphi s(c')}$ is obtained without decryption. "0" indicates a 0th degree polynomial 0.

Here, $\varphi s(c')$ is a plaintext obtained by applying a decryption function to the following LWE ciphertext c'.

In BlindRotate, the following polynomial T(X)

$$T(X) = F(X) \cdot X^{n/2}$$

is prepared, which is obtained by multiplying the following polynomial F(X)

$$F(X) = \mu X^{n-1} + \mu X^{n-2} + \ldots \mu X + \mu$$

where $\mu = \frac{1}{8}$, that forms the above-described finite cyclic group and serves as a test vector, by $X^{n/2}$.

It is assumed that there is a TLWE ciphertext c obtained by encrypting the plaintext $\mu 1$ with the private key [s].

Each element of this TLWE ciphertext $c = ([a], b)$ is multiplied by 2n and is then rounded off, whereby a LWE ciphertext $c' = ([a'], b')$ is obtained.

When the LWE ciphertext $c' = ([a'], b')$ is decrypted, $\mu 1' = \varphi_s(c') \approx 2n \times \varphi_s(c) = 2n\mu 1$ is obtained.

A trivial TRLWE ciphertext (0, T(X)) whose plaintext is the polynomial T(X) is prepared, and it is assumed that $A_0 = X^{-b'} \times (0, T(X)) = (0, X^{-b'} \times T(X))$, where 0 indicates a 0th order polynomial 0. At this time, since b' is an integer, exponentiation can be defined naturally.

Subsequently, $A^i = CMux(BK^i, A_{i-1}, X^{a'i}A_{i-1})$ is calculated in turn by using $BK^i$ that is the Bootstrapping Key described above. Since a'i is an integer also in this expression, a power of X can be defined naturally.

Accordingly, the plaintext is not changed when $s_i$ is 0, and multiplication by $X^{a'i}$ is performed in turn when $s_i$ is 1.

Therefore, calculation is repeated as represented by $$\phi'_s(A_0) = X^{-b'}T(X)$$

$$\phi'_s(A_1) = X^{s_1 a'_1 - b'}T(X)$$

$$\phi'_s(A_2) = X^{s_2 a'_2 + s_1 a'_1 - b'}T(X),$$

then $$\phi_{s'}(A_n) = X^{\sum_{i=1}^{N} s_i \times a'_i - b'}T(X)$$

is obtained.
Here, $$\sum_{i=1}^{N} s_i \times a'_i - b'$$

is equal to the decryption function $\varphi s(c')$ with the sign reversed. Therefore, $$\phi'_s(A_n) = X^{-\phi_s(c')}T(X).$$

is obtained. Here, $\varphi_s(A_n)$ is a polynomial obtained by multiplying the polynomial $T(X)$ by $X^{-1}\mu 1'$ times.

(2) SampleExtract

In the plaintext polynomial $\varphi_s(A_n)$ obtained by decrypting the TRLWE ciphertext $A_n$ obtained by BlindRotate in (1), $n/2 - \varphi_s(c')$ terms from the lowest term have a coefficient of $-\mu$. When $\varphi_s(A_n)$ is negative, coefficients are $-\mu$ from the highest term in turn conversely.

When attention is paid only to a constant term of the plaintext polynomial $\varphi_s(A_n)$ obtained by decrypting the TRLWE ciphertext $A_n$, the constant term is $\mu$ if $\varphi_s(c')$ is equal to or greater than $n/2$ and less than $3n/2$, that is, $\varphi_s(c)$ is $\frac{1}{2} \pm \frac{1}{4}$. Otherwise, i.e., if $\varphi_s(c)$ is $\pm\frac{1}{4}$, the constant term is $-\mu$.

SampleExtract is a process for extracting only the coefficient of the constant term of the plaintext polynomial $\varphi_s(A_n)$ from the TRLWE ciphertext $A_n$ obtained by BlindRotate in (1) without decrypting the TRLWE ciphertext $A_n$, thereby obtaining a TLWE ciphertext cs.

The process for obtaining the TLWE ciphertext cs is described.

All TRLWE ciphertexts can be expressed as (A(X), B(X)) by putting polynomials as follows $$A(X) = \sum_{i=1}^{n} a_i X^{i-1}$$
$$B(X) = \sum_{i=1}^{n} b_i X^{i-1},$$

where n is the order.

When decryption with the private key [s'] is performed, the expression can be expanded by putting a polynomial of the private key as $$S'(X) = \sum_{j=1}^{n} s'_j X^{j-1}.$$

Then, $$\phi_{s'}(c) = B(X) - S'(X) \cdot A(X) = \sum_{i=1}^{n} b_i X^{i-1} - \sum_{i=1}^{n} \sum_{j=1}^{n} a_i s'_j X^{(i+j-2)}$$

is obtained.

The following operation is then performed with regard to this expression.

$$\sum_{i=1}^{n} b_i X^{i-1} - \sum_{i=1}^{n} \sum_{j=1}^{n} a_i s'_j X^{(i+j-2)} = \sum_{i=1}^{n} b_i X^{i-1} - \sum_{i=1}^{n} \sum_{j=i-1}^{n+i-2} a_i s'_{j-i+2} X^j$$

$$= \sum_{i=1}^{n} b_i X^{i-1} - \sum_{i=1}^{n} \sum_{j=i-1}^{n-1} a_i s'_{j-i+2} X^j - \sum_{i=1}^{n} \sum_{j=n}^{n+i-2} a_i s'_{j-i+2} X^j$$

$$= \sum_{j=1}^{n} b_j X^{j-1} - \sum_{j=0}^{n-1} \sum_{i=1}^{j+1} a_i s'_{j-i+2} X^j - \sum_{j=n}^{2n-2} \sum_{i=j-n+2}^{n} a_i s'_{j-i+2} X^j$$

$$= \sum_{j=0}^{n-1} b_{j+1} X^j - \sum_{j=0}^{n-1} \sum_{i=0}^{j} a_{i+1} s'_{j-i+1} X^j - \sum_{j=0}^{n-2} \sum_{i=j-n+1}^{-1} a_{i+n+1} s'_{j-i+1} X^{j+n}$$

$$= \sum_{j=0}^{n-2} b_{j+1} X^j + b_n X^{n-1} - \sum_{j=0}^{n-2} \sum_{i=0}^{j} a_{i+1} s'_{j-i+1} X^j - \sum_{i=0}^{n-1} a_{i+1} s'_{n-i} X^{n-1} - \sum_{j=0}^{n-2} \sum_{i=j-n+1}^{-1} a_{i+n+1} s'_{j-i+1} X^{j+n}$$

$$= \sum_{j=0}^{n-2} \left( b_{j+1} X^j - \sum_{i=0}^{j} a_{i+1} s'_{j-i+1} X^j - \sum_{i=j-n+1}^{-1} a_{i+n+1} s'_{j-i+1} X^{j+n} \right) + b_N X^{n-1} - \sum_{i=0}^{n-1} a_{i+1} s'_{n-i} X^{n-1}$$

Since this is "a factor ring of a polynomial ring", the remainder when this is divided by $(X^n+1)$ is calculated. Then, $$\sum_{j=0}^{n-2} \left( b_{j+1} X^j - \sum_{i=0}^{j} a_{i+1} s'_{j-i+1} X^j + \sum_{i=j-n+1}^{-1} a_{i+n+1} s'_{j-i+1} X^j \right) + b_N X^{n-1} - \sum_{i=0}^{n-1} a_{i+1} s'_{n-i} X^{n-1} =$$

$$\sum_{j=0}^{n-2} \left( b_{j+1} - \sum_{i=0}^{j} a_{i+1} s'_{j-i+1} + \sum_{i=j-n+1}^{-1} a_{i+n+1} s'_{j-i+1} \right) X^j +$$

-continued $$\left(b_n - \sum_{i=0}^{n-1} a_{i+1} s'_{n-i}\right) X^{n-1}$$

is obtained.
Further, when $$a'_i = \begin{cases} a_i & (i \geq 1) \\ -a_{i+n} & (\text{otherwise}) \end{cases},$$

is put, then $$= \sum_{j=0}^{n-2} \left(b_{j+1} - \sum_{i=0}^{j} a'_{i+1} s'_{j-i+1} - \sum_{i=j-n+1}^{-1} a'_{i+1} s'_{j-i+1}\right) X^j +$$

$$\left(b_N - \sum_{i=0}^{n-1} a'_{i+1} s'_{n-i}\right) X^{n-1}$$

$$= \sum_{j=0}^{n-2} \left(b_{j+1} - \sum_{i=j-n+1}^{j} a'_{i+1} s'_{j-i+1}\right) X^j + \left(b_N - \sum_{i=0}^{n-1} a_{i+1} s'_{n-i}\right) X^{n-1}$$

$$= \sum_{j=0}^{n-2} \left(b_{j+1} - \sum_{i=0}^{n-1} a'_{i+j-n+2} s'_{n-1}\right) X^j + \left(b_N - \sum_{i=0}^{n-1} a_{i+1} s'_{n-i}\right) X^{n-1}$$

$$= \sum_{j=0}^{n-1} \left(b_{j+1} - \sum_{i=0}^{n-1} a'_{i+j-n+2} s'_{n-i}\right) X^j$$

is obtained, and coefficients of respective terms in a plaintext polynomial are obtained from $$\phi'_s(c) = \sum_{j=0}^{n-1} \left(b_{j+1} - \sum_{i=0}^{n-1} a'_{i+j-n+2} s'_{n-i}\right) X^j.$$

Among the obtained coefficients, a coefficient of a constant term is necessary. Therefore, when a coefficient for j=0 is extracted, $$b_1 - \sum_{i=0}^{n-1} a'_{i-n+2} s'_{n-i}$$

is obtained. When $$a''_i = a'_{-i+2},$$

is put, the extracted coefficient can be deformed to a decryption function of TLWE encryption as represented by $$b_1 - \sum_{i=0}^{n-1} a''_{n-i} s'_{n-i} = b_1 - \sum_{i=0}^{n-1} a''_i s'_i = b_1 - \vec{s'} \cdot \vec{a'} = \phi_{s'}\left(\vec{a'}, b_1\right).$$

That is, when coefficients are extracted from the TRLWE ciphertext $A_n=(A(X), B(X))$ obtained by BlindRotate in (1) while the coefficients are set as $$a''_i = \begin{cases} a_1 & (i = 1) \\ -a_{-i+n+2} & (\text{otherwise}) \end{cases},$$

a new TLWE ciphertext ([a"], $b_1$) is obtained which has, as a plaintext, the same value as a constant term of a plaintext polynomial corresponding to the original TRLWE ciphertext $A_n$. This new TLWE ciphertext is the output of SampleExtract and has either of two types of plaintexts, i.e., $-\mu$ or $\mu$.

A trivial ciphertext ([0], μ) of which the plaintext is μ is added to the thus obtained TLWE ciphertext, thereby obtaining a TLWE ciphertext cs=([a"], b1)+([0], μ).

Specifically, since μ=⅛ in the polynomial F(X) as a test vector, a ciphertext of −⅛ or ⅛ is obtained in this stage.

When the trivial TLWE ciphertext ([0], ⅛) of which the plaintext is μ=⅛ is added to this ciphertext, $$-1/8 + 1/8 = 0$$

$$1/8 + 1/8 = 1/4$$

are established, and thus a new TLWE ciphertext cs having either of two values, i.e., 0 or ¼ as the plaintext is obtained. The manipulation above is called SampleExtract in TFHE.

(3) Key Switching

The TLWE ciphertext cs obtained in SampleExtract in (2) is encrypted with the private key [s'], not with the private key [s].

Therefore, it is necessary to replace the key of the TLWE ciphertext cs with the private key [s] and return the state of the ciphertext to a state where encryption has been performed with the private key [s], without decrypting the TLWE ciphertext cs.

Therefore, a method of Public Key Switching is described.

The private key [s] for a TLWE ciphertext used in a NAND operation is an N-th order vector.

By using this vector, the private key [s'] that is an n-th order vector when the Bootstrapping Key has been created is encrypted.

That is, the private key [s'] is encrypted as a value obtained by shifting an element of the circle group {T} to each digit of a real number from 0 to 1 in binary notation, as represented by $$s'_i \times 2^{-1} s'_i \times 2^{-2} s'_i \times 2^{-3}$$

The private key is [s]. A "number of digits" t is a system parameter.

When decryption is performed with the private key [s], $$\phi_s(KS_{i,j}) = s'_i \times 2^{-j}$$

is obtained. This is a "KeySwitching key".

As described above, the TLWE ciphertext cs=([a], b) obtained in (2) is 0 or ¼ encrypted with the private key [s']. The number of elements of [a] is the same as that of the private key [s'] and is n.

When the elements are converted to t-bit fixed-point numbers by one each, the elements can be written in the following form.

$$a_i \approx \sum_{j=1}^{t} a_{i,j} \times 2^{-j}.$$

Although an error is increased in this stage, the maximum value of the absolute value can be limited by a system parameter.

As main processing of Key Switching, the following TLWE ciphertext cx is calculated.

$$cx = \left(\vec{0}, b\right) - \sum_{i=1}^{n}\sum_{j=1}^{t} a_{i,j} \times KS_{i,j}$$

Since the term ([0], b) is a trivial ciphertext, this term is b when being decrypted. A result of decrypting the TLWE ciphertext cx is as follows.

$$\phi_s(cx) = b - \sum_{i=1}^{n}\sum_{j=1}^{t} a_{i,j} \times s'_i \times 2^{-j} = b - \sum_{i=1}^{n}\sum_{j=1}^{t} s'_i \times a_{i,j} \times 2^{-j}$$

Since $s'_i$ is a constant for j, it is factored out as follows.

$$= b - \sum_{i=1}^{n} s'_i \sum_{j=1}^{t} a_{i,j} \times 2^{-j},$$

The expression obtained in decomposition into the fixed-point numbers is then substituted.

$$\approx b - \sum_{i=1}^{n} s'_i \times a_i = \phi'_s\left(\left(\vec{a}, b\right)\right) = \phi'_s(c_s)$$

As a result, $$\phi_s(cx) \approx \phi'_s(c_s)$$

is obtained. That is, key switching is successful.

The TLWE ciphertext cx obtained here is encrypted with the private key [s] that is the same as the private key for the TLWE ciphertext c used as the input of Gate Bootstrapping.

By performing the processing of Key Switching, the ciphertext returns to the TLWE ciphertext encrypted with the private key [s], so that its plaintext $\phi_s(cx)$ is 0 when $\phi_s(c)$ is in a range of $\pm\frac{1}{4}$, and is $\frac{1}{4}$ when $\phi_s(c)$ is in a range of $\frac{1}{2}\pm\frac{1}{4}$.

With the processing described above, a TLWE ciphertext is obtained as a result of Gate Bootstrapping, which is either of two values, i.e., 0 or $\frac{1}{4}$ and has any error within $\pm\frac{1}{16}$.

The maximum value of the error does not depend on the TLWE ciphertext c that is the input, and is a value fixed by a system parameter.

Therefore, the system parameter is set in such a manner that the maximum value of the error is any value within $\pm\frac{1}{16}$ that is the same range as that for a TLWE ciphertext as the input.

This setting enables a NAND operation to be performed any number of times, enabling any kind of operation including addition and multiplication.

Examples of the error added to the "plaintext" of a TLWE ciphertext output from Gate Bootstrapping include an error added by rounding off a TLWE ciphertext, an error added by CMux, and an error when the TLWE ciphertext is converted to a fixed-point number in Public Key Switching. All these errors can be limited by a system parameter, and the system parameter can be adjusted in such a manner that an error for which all things are considered falls within $\pm\frac{1}{16}$.

The processing described above is processing of Gate Bootstrapping in TFHE.

The encryption processing device 1 that deals with the TFHE encryption described above can be applied to the following example.

For example, there is a case in which it is desired to perform aggregation on a database in which fields or records are encrypted by TLWE encryption (hereinafter, "encrypted database") by category (e.g., by average age in each district).

In this case, the encryption processing device 1 is a database sever that manages the encrypted database, receives a query encrypted by TLWE encryption from a terminal device connected to the server via a network or the like, and returns a response to the query, encrypted by TLWE encryption, to the terminal device.

Since TFHE is not deterministic encryption, innumerable ciphertexts correspond to the same plaintext in the encrypted database.

Therefore, in a case of aiming to perform aggregation by category on the encrypted database, it is uncertain to which category each record is aggregated.

According to the method described below, it is possible to perform aggregation on the encrypted database in which categorization has been performed, and to sort (rearrange) the results of aggregation at high speed.

With the method of sorting (rearranging) the results of aggregation according to the present embodiment, it is possible to respond the query after the results of aggregation are arranged from the largest value to the smallest value (in descending order) or from the smallest value to the largest value (in ascending order).

The sorting method according to the present embodiment can speed up an operation used for sorting (rearranging) and can make a response with an about 20 percent lower latency as compared with implementation not using the sorting method according to the present embodiment.

In the present embodiment, the encryption processing device 1 creates an empty response in advance in order to perform categorization and aggregation for each category.

Aggregation on the database is performed by repeating a process of performing comparison with the empty response that remains encrypted, adding a query column only when categories match, and adding 0 when the categories do not match.

Bubble sort is used for sorting the results of aggregation.

Bubble sort is a sorting algorithm that compares values of two adjacent elements with each other and swaps the elements from the largest value to the smallest value (in descending order) or from the smallest value to the largest value (in ascending order).

Bubble sort is not often used for sorting based on plaintexts because its average calculation time is $O(q^2)$, which is relatively slow.

However, bubble sort has an advantage that sorting is always completed by repeating the process for the worst case complexity $O(q^2)$. Further, bubble sort does not change the process depending on the content of data unlike quick sort, and therefore can process ciphertexts without decrypting them.

In addition, bubble sort repeats a manipulation of performing comparison and, when the magnitude correlation is reversed, swapping the order, the same number of times as the square of the number of pieces of data $q-1$ $((q-1)^2)$. Comparison can be determined based on a borrow bit when subtraction is performed.

In bubble sort of encrypted records, comparison between adjacent encrypted records can be performed by employing the configuration of a full adder that can perform an operation of fully homomorphic encryption.

When the full adder that can perform an operation of fully homomorphic encryption is implemented by software, an operation is performed with a concept of designing a logic circuit (a logic gate) for ciphertexts.

A full adder circuit is configured by two half adders and one OR circuit unit (an arithmetic processing unit for obtaining OR).

The first half adder includes an AND circuit unit (an arithmetic processing unit for obtaining AND) and an XOR circuit unit (an arithmetic processing unit for obtaining XOR).

The second half adder includes an AND circuit unit (an arithmetic processing unit for obtaining AND) and an XOR circuit unit (an arithmetic processing unit for obtaining XOR).

Inputs A and B to be added together are input to the AND circuit unit and the XOR circuit unit of the first half adder.

The output of the AND circuit unit of the first half adder and the output of the AND circuit unit of the second half adder are input to the OR circuit unit in the latter stage, and a carry output (Carry out) is output from the OR circuit unit.

The output from the XOR circuit unit of the first half adder and the carry input (Carry in) are input to the AND circuit unit and the XOR circuit unit of the second half adder.

The output (Sum) of the full adder circuit is output from the XOR circuit unit of the second half adder.

In bubble sort, a process of swapping adjacent records or not swapping them depending on the comparison result is performed.

In a case of TFHE, a high-speed conditional swap operation using homomorphic MUX (HomMUX in the aforementioned paper) described also in FIG. 1 can also be used for the process of bubble sort.

A process of aggregation on an encrypted database by the encryption processing device 1 according to the present embodiment is described more specifically.

FIG. 6 is a diagram illustrating an example of an encrypted database.

The encrypted database 60 illustrated in FIG. 6 is stored in the storage unit 20 of the encryption processing device 1, for example. The encryption processing device 1 can serve as a database server that manages the encrypted database 60 and performs a manipulation to the encrypted database 60 in response to a query from an external device.

The encrypted database 60 in FIG. 6 includes a column 61, a column 62, and a column 63.

In the columns 61, 62, and 63, a "name", an "address", and an "age" are stored, respectively.

In the first field of the "name" column 61, the header "NAME" is stored. In the first field of the "address" column 62, the header "ADDRESS" is stored. In the first field of the "age" column 63, the header "AGE" is stored.

Data is registered in a plurality of fields included in each of the "name" column 61, the "address" column 62, and the "age" column 63.

As for the encrypted database 60 illustrated in FIG. 6, although plaintexts are displayed for the sake of convenience of the explanation, all data in the encrypted database 60 is actually TLWE ciphertexts that can be used in TFHE.

In the following descriptions, the first row displaying headers in the encrypted database 60 in FIG. 6 is excluded from row count. The second row of the encrypted database 60, in which a name, an address, and an age are registered actually ("Taro SUZUKI" in the name field), is counted as the first row, the third row ("Takashi SATO" in the name field) is counted as the second row, and so on.

In the present embodiment, the encryption processing device 1 runs a query for obtaining an "average age" for each "address" on the encrypted database 60, as one example.

In the present embodiment, an empty response (an empty table) as illustrated in FIG. 7 is used in a process of aggregation on the encrypted database 60.

FIG. 7 is a diagram illustrating an example of a table as an empty response.

In respective fields of an empty table (TBL) 70 in FIG. 7, an "address" that is a key of a query and a "total age" and the "number of people" that are to be obtained in the process of aggregation are stored.

The empty table 70 includes a column 71, a column 72, and a column 73.

In the columns 71, 72, and 73, an "address", a "total age", and the "number of people" are stored, respectively.

In the first field of the "address" column 71, the header "ADDRESS" is stored. In the first field of the "total age" column 72, the header "TOTAL AGE" is stored. In the first field of the "number of people" column 73, the header "NUMBER OF PEOPLE" is stored.

As described above, in each field of the "address" column 71, "address" data that is the same as data registered in the "address" column 62 of the encrypted database 60 in FIG. 6 is stored. A query in the present embodiment is run assuming that it is known what data is registered in at least the "address" column 62 storing therein an "address" in the encrypted database 60.

In the empty table 70 in its initial state, "0" is registered in all fields of the "total age" column 72 and the "number of people" column 73 respectively storing therein a "total age" and the "number of people" obtained in the process of aggregation.

All data in the empty table 70 is TLWE ciphertexts encrypted by the TFHE method.

Creation and encryption of the empty table 70 may be performed on a terminal device that issues a query, that is, issues a search request or on the encryption processing device 1 that manages the encrypted database 60.

The encryption processing device 1 sequentially compares address data stored in all rows of the "address" column 71 of the empty table 70 (FIG. 7) with address data registered in a specific row (a record) of the "address" column 62 of the encrypted database 60 (FIG. 6).

Comparison between address data is comparison between character string data. When the address data in the encrypted database 60 and one address data in the empty table 70 are compared with each other, the encryption processing device 1 performs EXNOR, which is a bit operation by TFHE, between bits at the same position of the address data in the encrypted database 60 and the address data in the empty table 70.

In more detail, the encryption processing device 1 performs EXNOR between the first bits of the address data in the encrypted database 60 and the address data in the empty table 70, for the second bits, for the third bits, and so on.

The result of EXNOR is "1" when the bits match each other, and "0" when the bits do not match. The encryption processing device 1 aggregates the results of EXNOR by AND.

The result of aggregation is a ciphertext "1" when the address data in the encrypted database 60 and the address data in the empty table 70 match each other completely, and is a ciphertext "0" when both the data do not match even partially.

That is, the encryption processing device 1 calculates cr=(a0 EXNOR b0) AND (a1 EXNOR b1) AND . . . where the address data in the encrypted database 60 and the address data in the empty table 70 are ai and bi (i indicates a position in bit unit in each piece of character string data), respectively.

The calculation result cr is a result of comparison between the address data in the encrypted database 60 and the address data in the empty table 70.

When both of the data completely match, that is, indicate the same address, a plaintext of the comparison result cr is bit "1". When both of the data do not match, the plaintext of the comparison result cr is bit "0".

Next, for a bit value stored in a field of the "age" column 63 of the encrypted database the encryption processing device 1 performs a process of homomorphic AND (HomAND in the aforementioned paper) of the above comparison result cr (a ciphertext having bit "1" or "0" as a plaintext) related to a corresponding address.

As a result, when addresses match each other (the plaintext of the comparison result cr is bit "1"), a corresponding "age" is obtained. When addresses are different from each other (the plaintext of the comparison result cr is bit "0"), "0" is obtained.

The encryption processing device 1 performs an identical operation for data in all address fields of the "address" column 71 of the empty table 70.

The encryption processing device 1 adds the obtained value of "age" (a ciphertext) in a field of the "total age" column 72 of the empty table 70, the field corresponding to the address for which comparison has been performed.

At this time, the obtained value of "age" (a ciphertext) has been added in the field of the "total age" column 72 of the empty table 70, the field corresponding to the address that has matched the address in the encrypted database 60. In a field of the "total age" column 72 which corresponds to the address that has not matched the address in the encrypted database 60, "0" has been added.

That is, the encryption processing device 1 compares a value in the empty table 70 and a value in the encrypted database 60 with each other to obtain the comparison result cr. The encryption processing device 1 then performs AND of the value in the encrypted database 60 and the comparison result cr (a ciphertext having bit "1" or "0" as a plaintext) and performs addition. At this time, the value in the encrypted database is added in the empty table 70 when the value in the empty table 70 and the value in the encrypted database 60 match each other, and 0 is added when these values are different from each other.

Further, the encryption processing device 1 adds an obtained value of the "number of people" (a ciphertext) in a field of the "number of people" column 73 of the empty table 70, the field corresponding to the address for which comparison has been performed.

At this time, the comparison result cr (a ciphertext having bit "1" as a plaintext) is added in a field of the "number of people" column 73 of the empty table 70 which corresponds to the address that has matched the address in the encrypted database 60. In addition, the comparison result cr (a ciphertext having bit "0" as a plaintext) is added in a field of the "number of people" column 73 of the empty table 70 which corresponds to the address that has not matched the address in the encrypted database 60.

By performing the above processes for all rows in the encrypted database 60, an aggregation result table 80 is obtained finally in which the "total age" and the number of people are aggregated for each address as illustrated in FIG. 8.

The above comparison result cr is obtained while being encrypted, and the encryption processing device 1 cannot know the plaintext of the comparison result cr. That is, the encryption processing device 1 does not know whether address data in the encrypted database 60 and address data in the empty table 70 match each other.

As described above, the encryption processing device 1 performs addition by performing homomorphic AND (HomAND) of the value in the encrypted database 60 and the comparison result cr regardless of whether the plaintext of the comparison result cr is "1" or "0".

The encryption processing device 1 does not cause processing to branch depending on whether the address data in the encrypted database 60 and address data in the empty table 70 match each other.

An aggregation process on an encrypted database is described more specifically.

For example, the encryption processing device 1 performs aggregation by EXNOR and AND bit by bit for data in an address field of the first row record (name: Taro SUZUKI, address: Chiyoda Ward, age: 46) in the encrypted database 60 and data (Chiyoda Ward, Minato Ward, and Taito Ward) in each of address fields in the empty table 70.

In this case, a ciphertext having bit "1" as a plaintext is obtained as a comparison result with regard to "Chiyoda Ward" in the empty table 70.

Therefore, the encryption processing device 1 adds "46" obtained by performing AND of the value in the age field of the first row record in the encrypted database 60 and the comparison result cr (its plaintext is bit "1"), to the total age field in the row corresponding to Chiyoda Ward in the empty table 70, and adds 1 (a ciphertext as a comparison result having bit "1" as a plaintext) to the number of people field in the row corresponding to Chiyoda Ward in the empty table 70. With regard to an address other than "Chiyoda Ward", a ciphertext having bit "0" as a plaintext is obtained as a comparison result. Therefore, 0 is added to the total age field and the number of people field of the corresponding row.

Next, the encryption processing device 1 performs aggregation by EXNOR and AND bit by bit for data in the address field of the second row record (name: Takashi SATO, address: Minato Ward, age: 50) in the encrypted database 60 and data (Chiyoda Ward, Minato Ward, and Taito Ward) in each of address fields in the empty table 70.

In this case, a ciphertext having bit "1" is obtained as a comparison result with regard to "Minato Ward" in the empty table 70.

Therefore, the encryption processing device 1 adds "50" obtained by performing AND of the value in the age field of the second row record in the encrypted database 60 and the comparison result cr (its plaintext is bit "1"), to the total age field in the row corresponding to Minato Ward in the empty table 70, and adds 1 (a ciphertext as a comparison result having bit "1" as a plaintext) to the number of people field in the row corresponding to Minato Ward in the empty table 70. With regard to an address other than "Minato Ward", a ciphertext having bit "0" as a plaintext is obtained as the comparison result. Therefore, 0 is added to the total age field and the number of people field of the corresponding row.

Next, the encryption processing device 1 performs aggregation by EXNOR and AND bit by bit for data in an address field of the third row record (name: Jiro TANAKA, address: Chiyoda Ward, age: 34) in the encrypted database 60 and data in each of address fields in the empty table 70 (Chiyoda Ward, Minato Ward, and Taito Ward).

In this case, a ciphertext having bit "1" is obtained as a comparison result with regard to "Chiyoda Ward" in the empty table 70.

Therefore, the encryption processing device 1 adds "34" obtained by performing AND of the value in the age field of the third row record in the encrypted database 60 and the comparison result cr (its plaintext is bit "1"), to the total age field in the row corresponding to Chiyoda Ward in the empty table 70, and adds 1 (a ciphertext as a comparison result having bit "1" as a plaintext) to the number of people field in the row corresponding to Chiyoda Ward in the empty table 70. With regard to an address other than "Chiyoda Ward", a ciphertext having bit "0" as a plaintext is obtained as a comparison result. Therefore, 0 is added to the total age field and the number of people field of the corresponding row.

Next, the encryption processing device 1 performs aggregation by EXNOR and AND bit by bit for data in the address field of the fourth row record in the encrypted database 60 (name: Koji YOSHIKAWA, address: Taito Ward, age: 58) and data in each of address fields in the empty table 70 (Chiyoda Ward, Minato Ward, and Taito Ward).

In this case, a ciphertext having bit "1" is obtained as a comparison result with regard to "Taito Ward" in the empty table 70.

Therefore, the encryption processing device 1 adds "58" obtained by performing AND of the value in the age field of the fourth row record in the encrypted database 60 and the comparison result cr (its plaintext is bit "1"), to the total age field in the row corresponding to Taito Ward in the empty table 70, and adds 1 (a ciphertext as a comparison result having bit "1" as a plaintext) to the number of people field in the row corresponding to Taito Ward in the empty table 70.

With regard to an address other than "Taito Ward", a ciphertext having bit "0" as a plaintext is obtained as a comparison result. Therefore, 0 is added to the total age field and the number of people field of the corresponding row.

Next, the encryption processing device 1 performs aggregation by EXNOR and AND bit by bit for data in the address field of the fifth row record in the encrypted database 60 (name: Sadamune TAKEDA, address: Minato Ward, age: 43) and data in each of address fields in the empty table 70 (Chiyoda Ward, Minato Ward, and Taito Ward).

In this case, a ciphertext having bit "1" is obtained as a comparison result with regard to "Minato Ward" in the empty table 70.

Therefore, the encryption processing device 1 adds "43" obtained by performing AND of the value in the age field of the fifth row record in the encrypted database 60 and the comparison result cr (its plaintext is bit "1"), to the total age field in the row corresponding to Minato Ward in the empty table 70, and adds 1 (a ciphertext as a comparison result having bit "1" as a plaintext) to the number of people field in the row corresponding to Minato Ward in the empty table 70.

With regard to an address other than "Minato Ward", a ciphertext having bit "0" as a plaintext is obtained as a comparison result. Therefore, 0 is added to the total age field and the number of people field of the corresponding row.

This process is performed for all records, whereby the aggregation result table 80 illustrated in FIG. 8 can be obtained.

In the above descriptions, comparison with the address field of the empty table 70 and aggregation of the total age and the number of people are performed sequentially for each row of the encrypted database 60.

The manner of aggregation is not limited thereto. Comparison between address data in the "address" column 62 and address data in the empty table 70 may be performed all at once, rows in the encrypted database 60 which corresponds to address records in the empty table 70 may be stored, and aggregation of the total age and the number of people may be performed later all at once. Conversely, comparison with the address field of the encrypted database 60 may be sequentially performed for each row of the empty table 70.

There is no difference between these methods in obtaining an age with regard to an address that has matched the address field of the empty table 70, adding up the number of people and the age for each address, and storing the results in the "total age" column 72 and the "number of people" column 73, respectively.

FIG. 8 is a diagram illustrating an example of an aggregation result table.

In respective fields of the aggregation result table 80 illustrated in FIG. 8, an "address", a "total age" that is an aggregation result and the "number of people" that is an aggregation result are stored.

The empty table 70 includes the column 71, the column 72, and the column 73.

In columns 81, 82, and 83, an "address", a "total age", and the "number of people" are stored, respectively.

In the first field of the "address" column 81, a header "ADDRESS" is stored. In the first field of the "total age" column 82, a header "TOTAL AGE" is stored. In the first field of the "number of people" column 83, a header "NUMBER OF PEOPLE" is stored.

Based on the aggregation result table 80 in FIG. 8, with regard to each address stored in the "address" column 81, a "total age" corresponding to the address and stored in the "total age" column 82 is divided by the "number of people" corresponding to the address and stored in the "number of people" column 83, whereby an "average age" for each address is obtained.

The "total age" and the "number of people" stored in the aggregation result table 80 are both Bit-wise type TLWE ciphertexts.

Division for obtaining the "average age" can be achieved by using a known method that performs binary division using a logical operation.

After aggregation on the encrypted database 60, an "average age" column may be added as a part of the aggregation result table 80, and a ciphertext of an "average age" may be written into a field corresponding to each address in the "average age" column.

In this case, when "addresses" are subjected to conditional swap based on "average ages", the "average ages" can also be swapped.

FIG. 9 is a flowchart for explaining a process flow of aggregation on an encrypted database by an encryption processing device. The process illustrated in FIG. 9 is a process performed when the encryption processing device 1 (the receiving unit 11) receives a query for performing aggregation and sorting on an encrypted database from an external device.

The encryption processing device 1 (the aggregation unit) substitutes the number of rows in the encrypted database 60, i.e., the number of records into a variable m and substitutes 1 into a variable p, thereby performing initialization at Step S101.

The encryption processing device 1 (the aggregation unit) compares address data in the p-th row in the encrypted database 60 and all address data in the empty table 70 with each other at Step S102. That is, the encryption processing device 1 calculates the comparison result cr=(a0 EXNOR b0) AND (a1 EXNOR b1) AND . . . where the address data in the encrypted database 60 and the address data in the empty table 70 are ai and bi (i indicates a position in bit unit in each piece of character string data), respectively, as described above.

When both of the address data completely match, the comparison result cr is a ciphertext of bit "1". When both of the address data are different from each other, the comparison result cr is a ciphertext of bit "0".

The encryption processing device 1 (the aggregation unit) performs AND of the comparison result cr (a ciphertext having bit "1" or "0" as a plaintext) to an "age" in the encrypted database 60 which corresponds to the address data at Step S103.

When the plaintext of the comparison result cr is bit "1", an age is obtained and is added to a total age field of the empty table 70.

When the plaintext of the comparison result cr is bit "0", 0 is obtained and is added to a total age field of the empty table 70.

That is, the encryption processing device 1 (the aggregation unit) calculates br+(cr AND ar) by using the comparison result cr, when it is assumed that an age in the encrypted database 60 is ar and a total age in the empty table 70 is br. Addition can be performed by, for example, the full adder described above.

The encryption processing device 1 (the aggregation unit) then performs AND of the comparison result cr (a ciphertext of bit "1" or "0") to the "number of people" in the empty table 70 which corresponds to the address data at Step S104.

When the plaintext of the comparison result cr is bit "1", 1 is added to the number of people field of the empty table 70.

When the plaintext of the comparison result cr is bit "0", 0 is added to the number of people field of the empty table 70.

The encryption processing device 1 (the aggregation unit) calculates dr+cr by using cr described above to obtain the number of people, assuming that the number of people in the empty table 70 is dr. Addition can be performed by, for example, the full adder described above. The comparison result cr is added while it is assumed that the comparison result cr is obtained by encrypting a 1-bit width integer.

The encryption processing device 1 (the aggregation unit) determines whether p=m is satisfied, that is, aggregation has been performed for all rows (records) in the encrypted database 60 at Step S105.

If p=m is not satisfied (No at Step S105), the encryption processing device 1 substitutes p+1 into the variable p to increment the variable p at Step S107 and returns the process to Step S102.

If p=m is satisfied (Yes at Step S105), the encryption processing device 1 (the aggregation unit) completes the aggregation result table 80 in FIG. 8 and ends the encrypted database aggregation process.

Sorting of the aggregation results from the highest average age to the lowest average age is considered. Use of bubble sort enables a sorting process to be performed in an encrypted state, as described above.

In bubble sort, a process of swapping adjacent pieces of data or not swapping them depending on a comparison result is performed.

As the property of bubble sort, when comparison and swap is repeated $(q-1)^2$ times in sorting on a table having q rows, the table can be surely sorted (rearranged) in descending order or ascending order safely. Here, computation for $(q-1)^2$ times is referred to as worst case complexity.

Bubble sort is suitable for sorting ciphertexts because sorting is completed by performing the worst case complexity of computation. However, the sorting method is not limited to bubble sort. Another sorting method can be employed, as long as it has an identical property.

Bubble sort has an advantage that a sorting process can be performed even if the contents of ciphertexts (plaintexts) are unknown, because bubble sort only repeats comparison and swap.

As one example, the sorting process can be performed by using a HomMUX (homomorphic MUX) operation. This process is the process described with reference to FIG. 1.

By repeating a process including the following procedures (1) to (5) for the number of rows in the aggregation result table 80 (FIG. 8), sorting of the rows on the aggregation result table 80 can be performed using an average age as a reference.

In the following descriptions, the first row displaying headers in the aggregation result table 80 in FIG. 8 is excluded from row count. The second row ("Chiyoda Ward" in the address field) of the aggregation result table 80, in which an address, a total age, and the number of people are registered actually, is counted as the first row, the third row ("Minato Ward" in the address field) is counted as the second row, and so on.

It is assumed that a value (data) of an average age based on a value in the "total age" column 82 and a value in the "number of people" column 83 in the i-th row is the ciphertext ay. Further, it is assumed that an "average age" based on a value in the "total age" column 82 and a value in the "number of people" column 83 in the (i−1)th row is the ciphertext bv.

Each of the ciphertext av and the ciphertext bv is a ciphertext indicating an "average age" that is a reference of conditional swap.

It is assumed that, with regard to "address", "total age", and "number of people" that are objects of conditional swap, a bit in the i-th row data is the ciphertext az and a bit at the same position in the (i−1)th row data is the ciphertext bz.

It is assumed that data in the new i-th row is the ciphertext az' and data in the new (i−1)th row is the ciphertext bz'.

When an "average age" in the (i−1)th row is larger than an "average age" in the i-th row, plaintexts of the ciphertext az' and the ciphertext az are made the same as each other, and plaintexts of the ciphertext bz' and the ciphertext bz are made the same as each other. Otherwise, the plaintexts of the ciphertext az' and the ciphertext bz are made the same as each other, and the plaintexts of the ciphertext bz' and the ciphertext az are made the same as each other.

Although the number of data rows is only three (q=3) in the aggregation result table 80 in FIG. 8, the same processing method can deal with more rows.

Bubble sort according to the present embodiment compares data in the i-th row and data in the (i−1)th row, adjacent to each other, and swaps them depending on the magnitude correlation.

Since the data in the i-th row and the data in the (i−1)th row are compared with each other, comparison is performed with an initial value of i set to 2.

First, average age 46.5 (the ciphertext av) for Minato Ward in the second row (i=2) and average age 40 (the ciphertext bv) for Chiyoda Ward in the first row (i−1=1) are compared with each other.

At this time, an MUX operation is performed twice based on the borrow bit cz obtained by performing subtraction between the ciphertext av in the second row (i=2) and the ciphertext bv in the first row (i−1=1), and the ciphertexts az and bz, thereby calculating the new ciphertexts az' and bz'.

In the case of FIG. 8, the average age (40) for Chiyoda Ward<the average age (46.5) for Minato Ward is established. The i-th row record and the (i−1)th row record are thus swapped, so that the row for Minato Ward becomes the first row, and the row for Chiyoda Ward becomes the second row as described below.

| | | |
|---|---|---|
| 1 | Minato Ward | 46.5 |
| 2 | Chiyoda Ward | 40 |
| 3 | Taito Ward | 58 |

Next, average age 58 (the ciphertext av) for Taito Ward in the third row (i=3) and average age 40 the ciphertext bv) for Chiyoda Ward in the second row (i−1=2) are compared with each other.

At this time, an MUX operation is performed twice based on the borrow bit cz obtained by performing subtraction between the ciphertext av in the third row (i=3) and the ciphertext bv in the second row (i−1=2), and the ciphertexts az and bz, thereby calculating the new ciphertexts az' and bz'.

In the case of FIG. 8, the average age (40) for Chiyoda Ward<the average age (58) for Taito Ward is established. The i-th row record and the (i−1)th row record are thus swapped, so that the row for Taito Ward becomes the second row, and the row for Chiyoda Ward becomes the third row as described below.

| | | |
|---|---|---|
| 1 | Minato Ward | 46.5 |
| 2 | Taito Ward | 58 |
| 3 | Chiyoda Ward | 40 |

As a result of performing comparison and swap for all rows (to the q-th row), Chiyoda Ward having the lowest average age is located at the bottom of the aggregation result table 80.

The same process as that described above is repeated for the number of rows.

The above-described sorting is sorting with regard to "address", and by performing an identical process using the borrow bit cz also with regard to "total age" and "number of people", sorting on the entire aggregation result table 80 can be performed.

Summarizing the above descriptions, the following procedures are performed.

Procedure (1): Initialization is performed by setting i to 2.

Procedure (2): A borrow bit obtained bv—the ciphertext bv—the ciphertext av is set to the ciphertext cz.

Procedure (3): The ciphertext az' is set to HomMUX (cz, az, bz), described later, for all bits.

Procedure (4): The ciphertext bz' is set to HomMUX (cz, bz, az) for all bits.

That is, in procedures (3) and (4), $$\text{Ciphertext } az'=\text{HomMUX}(cz, az, bz)$$

$$\text{Ciphertext } bz'=\text{HomMUX}(cz, bz, az)$$

are calculated.

When the plaintext of the ciphertext cz is 1, the plaintext of the ciphertext az is equal to the plaintext of the ciphertext bz', the plaintext of the ciphertext bz is equal to the plaintext of the ciphertext az', and as plaintexts, the i-th row record and the (i−1)th row record are swapped from the original order.

When the plaintext of the ciphertext cz is 0, the plaintext of the ciphertext az is equal to the plaintext of the ciphertext az', the plaintext of the ciphertext bz is equal to the plaintext of the ciphertext bz', and as plaintexts, the i-th row record and the (i−1)th row record are not swapped from the original order.

Procedure (5): The value of i is incremented by 1, and the process returns to procedure (2).

The above procedures are repeated until the value of i becomes equal to the number of rows q in the aggregation result table 80.

With these procedures, the largest (smallest) record pops up on the last row in the aggregation result table 80.

Procedures (1) to (5) are repeated for the number of rows q−1, and bubble sort is finished.

By performing the above process, sorting (bubble sort) on the aggregation result table 80 with an average age used as a reference can be performed in an encrypted state.

By performing the process of repeating procedures (1) to (5) with regard to data in each of the "address" column, the "total age" column, and the "number of people" column that are objects of conditional swap, sorting on the entire aggregation result table 80 can be performed.

The process of procedures (2) to (4) can be performed by, for example, the full adder described above and HomMUX described in the aforementioned paper.

HomMUX is briefly described. In the MUX operation described with reference to FIG. 1, a logical operation that selects two bits $d_0/d_1$ by one bit $c_0$ is expressed as ($c_0$ AND $d_1$) OR ((NOT $c_0$) AND $d_0$). The bit $c_0$ is the ciphertext cz in FIG. 1, and the two bits $d_0/d_1$ are the ciphertexts az/bz or the ciphertexts bz/az.

Since NOT does not require Gate Bootstrapping, natural implementation uses three Gate Bootstrapping by two AND operation units and one OR operation unit. As described with regard to FIG. 1, the NOT circuit unit 55 does not require Gate Bootstrapping, and therefore Gate Bootstrapping has to be performed in the latter stage of a homomorphic operation in each of the AND circuit units and the OR circuit unit.

Therefore, it is necessary to perform Gate Bootstrapping three times in the two AND circuit units 53 and 54 and the one OR circuit unit 55, respectively, in each of the MUX operation units 51 and 52 for calculating the new ciphertext az' from the ciphertexts az and bz in FIG. 1.

Gate Bootstrapping is performed three times in single processing by a multiplexer. Since the processing by the multiplexer is performed twice, necessary rearrangement requires enormous computation time.

The aforementioned paper has proposed HomMUX that is improvement of such multiplexer processing.

In this HomMUX, Gate Bootstrapping for the left side ($c_o$ AND $d_1$) and Gate Bootstrapping for the right side ((NOT $c_o$) AND $d_o$) are performed before key switching (after SampleExtract), and are added together while each result is a TLWE ciphertext having s' as a private key.

Since the left side and the right side of OR do not become ¼ simultaneously, the sum of the left-side TLWE ciphertext (its private key is s') and the right-side TLWE ciphertext (its private key is s') is 0 or ¼, and the private key becomes a TLWE ciphertext of s'. Thereafter, key switching is performed, thereby obtaining a TLWE ciphertext having a private key s.

This operation is possible because an error given up to SampleExtract is much (one or more orders of magnitude) smaller than an error given in key switching. Although the error is doubled by addition before key switching, it can be ignored because it is much smaller than the error given by key switching.

In bubble sort by this method, the encryption processing device performs subtraction once in procedure (2) in order to check whether the order of two rows is correct.

As a result of procedure (2), in order to perform necessary swap, a THFE multiplexer (HomMUX) operation is performed twice in each comparison in procedures (3) and (4). Since it takes the same processing time as that in a case of performing Gate Bootstrapping twice in one MUX operation, a calculation time for four times of BlindRotate (corresponding to four gates) is required for performing the MUX operation twice.

This computation time is less than that in the above example (Gate Bootstrapping is performed three times for one MUX operation). However, as for rearrangement of all the q rows, subtraction is performed $(q-1)^2$ times, and an MUX operation is performed $2(q-1)^2$ times. Therefore, to perform all necessary sorting requires enormous processing time.

Accordingly, in the present embodiment, procedures (3) and (4) among the above-described procedures that perform MUX twice in one rearrangement are replaced with other procedures, whereby processing for two MUX operations is speeded up and sorting is speeded up.

Specifically, a test vector polynomial is improved, and two ciphertexts are extracted by performing SampleExtract twice after single BlindRotate, whereby one rearrangement can be performed in a processing time for three gates (Gate Bootstrapping for three times). As compared with a case of using an MUX operation, the processing time becomes 3÷4=75% by simple calculation, so that a speed increase of about 25% is theoretically expected, and a speed increase of about 21% is confirmed in implementation.

This point is described in detail below.

The basic concept of bubble sort is the same as that in the above case of using the MUX operation described above. The method of calculating the ciphertexts az' and bz' from the ciphertexts az and bz is different.

First, as in the case of using the MUX operation, an average age of each row in the aggregation result table 80 (FIG. 8) is calculated based on a value in the "total age" column 82 and a value in the "number of people" column 83.

The calculation of the average age of each row can be performed by, for example, the full adder described above.

That is, it is assumed that a bit in data indicating an "average age" of the i-th row is the ciphertext av and a bit at the same position in data indicating the "average age" of the (i–1)th row is the ciphertext bv.

Each of the ciphertext av and the ciphertext bv is a ciphertext indicating an "average age" that is a reference of conditional swap.

It is assumed that, with regard to "address", "total age", and "number of people" that are objects of conditional swap, an arbitrary bit in the i-th row data is the ciphertext az and a bit at the same position in the (i–1)th row data is the ciphertext bz.

It is assumed that data in the new i-th row is the ciphertext az' and data in the new (i–1)th row is the ciphertext bz'.

When the "average age" in the (i–1)th row is larger than the "average age" in the i-th row, plaintexts of the ciphertext az' and the ciphertext az are made the same as each other, and plaintexts of the ciphertext bz' and the ciphertext bz are made the same as each other. Otherwise, the plaintexts of the ciphertext az' and the ciphertext bz are made the same as each other, and the plaintexts of the ciphertext bz' and the ciphertext az are made the same as each other.

Each of the TLWE ciphertext az, the TLWE ciphertext bz, and the TLWE ciphertext cz described below is set to $0\pm\frac{1}{16}$ as a plaintext in a case of bit "0" and to $\frac{1}{4}\pm\frac{1}{16}$ in a case of bit "1", as described in the aforementioned paper.

By procedures (11) to (14) described below, records in the aggregation result table 80 can be sorted using an average age as a reference.

Procedure (11): i is set to 2. As described above, the first row displaying headers in the aggregation result table 80 is excluded from row count. The second row ("Chiyoda Ward" in the address field) of the aggregation result table 80, in which an address, a total age, and the number of people have been registered actually, is counted as the first row, the third row ("Minato Ward" in the name field) is counted as the second row, and so on.

Procedure (12): A borrow bit (borrow) of the ciphertext bv—the ciphertext av of the average age, which is a reference of conditional swap, is assumed to the ciphertext cz.

Procedure (13): A sorting process described below is performed.

Procedure (14): The value of i is incremented by 1, and the process returns to procedure (12).

The process including procedures (11) to (14) is repeated for the number of rows in the aggregation result table 80 (FIG. 8) while incrementing the value of i. The largest (smallest) value thus pops up on an end of a list.

By repeating procedures (11) to (14) for the number of records (the number of rows except for the header) –1, all records in the aggregation result table 80 can be sorted in descending order or ascending order based on the "average age" used as a reference.

By performing the process of repeating procedures (12) to (14) with regard to data in each of the "address" column, the "total age" column, and the "number of people" column that are objects of conditional swap, sorting on the entire aggregation result table 80 can be performed.

Since the number of records in the aggregation result table 80 (FIG. 8) is three, a sorting process of procedures (12) and (13) is performed twice, and that sorting process is further repeated twice, so that the sorting process is performed four times in total at worst (worst case complexity $(q-1)^2 \rightarrow 2^2$).

Although bubble sort is $O(q^2)$, the actual complexity is $(q-1)^2$. Since $(q-1)^2=q^2-2q+1$, $O((q-1)^2)=O(q^2)$.

The operation of procedure (12) is also performed for $(q-1)^2$ times in total, where q is the number of records. This operation can also be performed by the full adder described above.

The sorting process in procedure (13) is performed by the following three steps.

[First Step]

First, the encryption processing device 1 calculates az+cz–(0, ⅛) to perform (first) Gate Bootstrapping described in the aforementioned paper.

In the aforementioned paper, $$F(X) = \mu X^{n-1} + \mu X^{n-2} + \ldots + \mu X + \mu$$

where $\mu = \frac{1}{8}$,
is used as a test vector in BlindRotate.

Meanwhile, the encryption processing device 1 uses, as a test vector in BlindRotate of Gate Bootstrapping, $$T1(X) = \mu_1 X^{n-1} + \mu_1 X^{n-2} + \ldots \mu_1 X^{(n/2)} + \mu_2 X^{(n/2)-1} + \ldots$$
$$\mu_2 X + \mu_2,$$

where $\mu_1 0$ and $\mu_2 = \frac{1}{2}$.

By using this test vector, $\frac{1}{2}$ is obtained in the stage immediately after SampleExtract when plaintext bits of the ciphertext az and the ciphertext cz are different from each other, and 0 is obtained when both the ciphertext az and the ciphertext cz are 0 or 1. Although $(0, \frac{1}{8})$ is added to this result in the aforementioned paper, no value is added here. Thereafter, key switching is performed in an identical manner to that in the aforementioned paper. Accordingly, the TLWE ciphertext tz is obtained which is a ciphertext of 0 or $\frac{1}{2}$ and has an error of $\pm\frac{1}{16}$.

Figure 10:
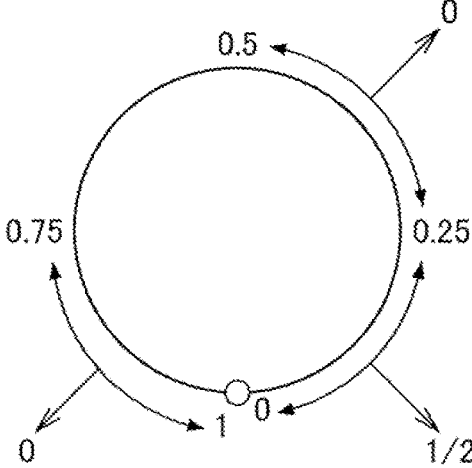
FIG. 10 is an explanatory diagram of an operation of Gate Bootstrapping at the first step.

FIG. 10 is an explanatory diagram of an operation of Gate Bootstrapping at the first step.

When key switching identical to that in the aforementioned paper is performed, a section from 0 to 0.25 ($\frac{1}{4}$) becomes $\frac{1}{2}$, and a section from 0.25 ($\frac{1}{4}$) to 0.5 ($\frac{1}{2}$) and a section from 0.75 ($\frac{3}{4}$) to 1 become 0, as illustrated in FIG. 10.

Consequently, the TLWE ciphertext tz is obtained in the first step, which can have two values of $\frac{1}{2}$ and 0 as a plaintext and has an error of $\pm\frac{1}{16}$.

When the value of the TLWE ciphertext cz and the value of the TLWE ciphertext az are different from each other, the plaintext of the TLWE ciphertext tz is $\frac{1}{2}$. When the value of the TLWE ciphertext cz and the value of the TLWE ciphertext az are the same as each other (are 0 or 1), the plaintext of the TLWE ciphertext tz is 0. A step of obtaining such a temporary ciphertext tz is the first step.

[Second Step]

Next, the encryption processing device 1 calculates $tz + bz - (0, \frac{1}{8})$ to perform (second) Gate Bootstrapping.

The encryption processing device 1 uses, as a test vector in BlindRotate of Gate Bootstrapping, $$T1(X) = \mu_1 X^{n-1} + \mu_1 X^{n-2} + \ldots \mu_1 X^{(n/2)} + \mu_2 X^{(n/2)-1} + \ldots$$
$$\mu_2 X + \mu_2,$$

in a manner identical to that described above. At this time, $\mu_1 = \frac{5}{8}$ and $\mu_2 = \frac{1}{8}$. Although $(0, \frac{1}{8})$ is added here in the aforementioned paper, no value is added in the present embodiment.

Figure 11:
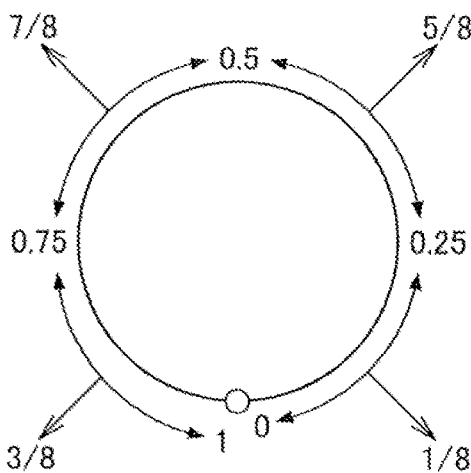
FIG. 11 is an explanatory diagram of an operation of Gate Bootstrapping at the second step.

FIG. 11 is an explanatory diagram of an operation of Gate Bootstrapping at the second step.

As a result of Gate Bootstrapping, a range from 0 to 0.25 ($\frac{1}{4}$) becomes $\frac{1}{8}$, and a range from 0.25 ($\frac{1}{4}$) to 0.5 ($\frac{1}{2}$) becomes $\frac{5}{8}$, as illustrated in FIG. 11.

These values are values specified in the test vector as $\mu_1$ and $\mu_2$, i.e., $\frac{5}{8}$ and $\frac{1}{8}$.

A range from 0.5 ($\frac{1}{2}$) to 0.75 ($\frac{3}{4}$) becomes $\frac{7}{8}$. This is because, since a negative value in a range from 0 to 0.25 ($\frac{1}{4}$) appears for the range of 0.5 ($\frac{1}{2}$) to 0.75 ($\frac{3}{4}$), $-\frac{1}{8}$ is obtained which corresponds to $\frac{7}{8}$ on the circle group $\{T\}$.

A range from 0.75 ($\frac{3}{4}$) to 1 becomes $\frac{3}{8}$. This is because, since a negative value in a range from 0.25 ($\frac{1}{4}$) to 0.5 ($\frac{1}{2}$) appears for the range of 0.75 ($\frac{3}{4}$) to 1, $-\frac{5}{8}$ is obtained which corresponds to $\frac{3}{8}$ on the circle group $\{T\}$. In the second step, the temporary ciphertext uz is obtained which has four values of $\frac{1}{8}$, $\frac{3}{8}$, $\frac{5}{8}$, and $\frac{7}{8}$ as a plaintext.

[Third Step]

Next, the encryption processing device 1 calculates $(0, \frac{1}{4}) - uz + cz$, thereby obtaining $\frac{1}{8}$, $\frac{3}{8}$, $\frac{5}{8}$, and $\frac{7}{8}$ as a calculation result. (Third) Gate Bootstrapping as in the aforementioned paper is performed these values.

FIG. 12 is an explanatory diagram of an operation of Gate Bootstrapping at the third step.

In the third Gate Bootstrapping, the encryption processing device 1 performs SampleExtract twice at sampling positions different from each other.

First, at the position 0, SampleExtract(0) is performed, and key switching is performed. Two values of $\frac{1}{8}$ and $\frac{7}{8}$ as illustrated in FIG. 12(a) are thus obtained.

Figure 12A:
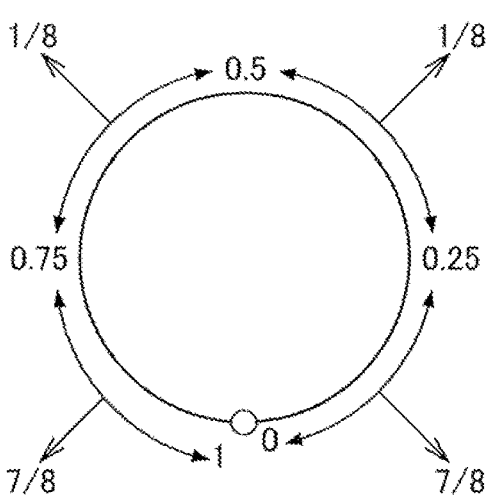
FIG. 12 is an explanatory diagram of an operation of Gate Bootstrapping at the third step.

A range from 0 to 0.25 ($\frac{1}{4}$) in FIG. 12(a) becomes $\frac{7}{8}$, and a range from 0.25 ($\frac{1}{4}$) to 0.5 ($\frac{1}{2}$) becomes $\frac{1}{8}$.

Since a negative value in a range from 0 to 0.25 ($\frac{1}{4}$) appears for the range of 0.5 ($\frac{1}{2}$) to 0.75 ($\frac{3}{4}$), a ciphertext of $-\frac{7}{8}$ is obtained. On the circle group $\{T\}$, $-\frac{7}{8}$ corresponds to $\frac{1}{8}$.

Since a negative value in a range from 0.25 ($\frac{1}{4}$) to 0.5 ($\frac{1}{2}$) appears for a range of 0.75 ($\frac{3}{4}$) to 1, a ciphertext of $-\frac{1}{8}$ is obtained. On the circle group $\{T\}$, $-\frac{1}{8}$ corresponds to $\frac{7}{8}$. When $(0, \frac{1}{8})$ is added to the obtained value, the new ciphertext az' is obtained which can have two values of 0 and $\frac{1}{4}$ as a plaintext.

Figure 12B:
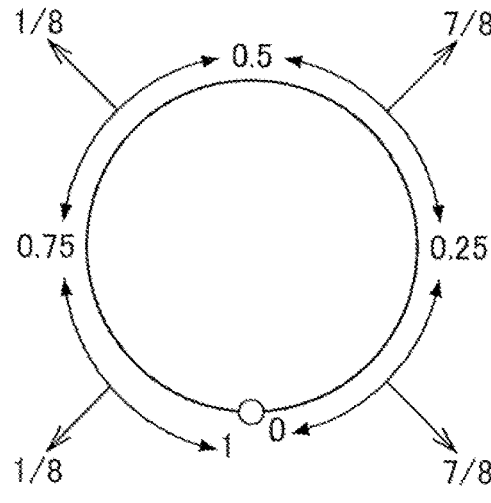

Further, at the position n/2, SampleExtract(n/2) is performed and key switching is performed. Two values of $\frac{1}{8}$ and $\frac{7}{8}$ are thus obtained as illustrated in FIG. 12(b). When the obtained value is subtracted from $(0, \frac{1}{8})$, the new ciphertext bz' that can have two values of 0 and $\frac{1}{4}$ as a plaintext is obtained.

A range from 0 to 0.25 ($\frac{1}{4}$) in FIG. 12(b) becomes $\frac{7}{8}$, and a range from 0.25 ($\frac{1}{4}$) to 0.5 ($\frac{1}{2}$) becomes $\frac{7}{8}$.

Since a negative value in a range from 0 to 0.25 ($\frac{1}{4}$) appears for a range of 0.5 ($\frac{1}{2}$) to 0.75 ($\frac{3}{4}$), a ciphertext of $-\frac{7}{8}$ is obtained. On the circle group $\{T\}$, $-\frac{7}{8}$ corresponds to $\frac{1}{8}$.

Since a negative value in a range from 0.25 ($\frac{1}{4}$) to 0.5 ($\frac{1}{2}$) appears for a range of 0.75 ($\frac{3}{4}$) to 1, a ciphertext of $-\frac{7}{8}$ is obtained. On the circle group $\{T\}$, $-\frac{7}{8}$ corresponds to $\frac{1}{8}$. When the obtained value is subtracted from $(0, \frac{1}{8})$, the new ciphertext bz' is obtained which can have two values of 0 and $\frac{1}{4}$ as a plaintext.

As described above, by performing Sample extract twice in one Gate Bootstrapping, the value of the ciphertext az' and the value of the ciphertext bz' can be obtained at once.

As a result, the number of times of Gate Bootstrapping (BlindRotate) can be reduced to three. As compared with a case where HomMUX in which Gate Bootstrapping is performed twice is used twice, it is possible to reduce the number of times of Gate Bootstrapping by one and to speed up sorting.

When the plaintext of the ciphertext cz is $\frac{1}{4}$, that is, 1 as a bit, and the one in the (i−1)th row is smaller, that is, the order is to be swapped, the plaintext of the ciphertext az is equal to the plaintext of the ciphertext bz', and the plaintext of the ciphertext bz is equal to the plaintext of the ciphertext az'. When the plaintext of the ciphertext cz is 0, the plaintext of the ciphertext az is equal to the plaintext of the ciphertext az', and the plaintext of the ciphertext bz is equal to the plaintext of the ciphertext bz'.

FIG. 13 is a diagram illustrating values that a ciphertext can have in a process of conditional swap according to the present embodiment.

(1) to (4) in FIG. 13 illustrate a case where the plaintext of the ciphertext cz indicating a borrow bit is 0.

In (1), when the plaintext of the ciphertext az of the i-th row data is 0 and the plaintext of the ciphertext bz of the (i−1)th row data is 0, the plaintext of the ciphertext tz obtained in the first step is 0. The plaintext of the ciphertext uz obtained in the second step is ⅜, and the plaintext of (0, ¼)−uz+cz obtained in the third step is ⅞.

The ciphertext az' of the new i-th row data obtained by adding (0, ⅛) to the value obtained by SampleExtract(0) described above is 0. Further, the ciphertext bz' of the new (i−1)th row data obtained by subtracting the value obtained by SampleExtract(n/2) described above from (0, ⅛) is 0.

In this case, the plaintext of the ciphertext az is equal to the plaintext of the ciphertext az', and the plaintext of the ciphertext bz is equal to the plaintext of the ciphertext bz'. When the ciphertexts az and bz are replaced with the new ciphertexts az' and bz', respectively, the i-th row record and the (i−1)th row record remain in original order as plaintexts.

Also in (2) to (4), the plaintext of the ciphertext az is equal to the plaintext of the ciphertext az', and the plaintext of the ciphertext bz is equal to the plaintext of the ciphertext bz' as in (1). In (2), for example, the plaintext of the ciphertext az of the i-th row data is 0, and the plaintext of the ciphertext bz of the (i−1)th row data is ¼. The plaintext of the ciphertext az' of the new i-th row data is 0, and the plaintext of the ciphertext bz' of the new (i−1)th row data is ¼.

When the ciphertexts az and bz are replaced with the new ciphertexts az' and bz', respectively, the i-th row record and the (i−1)th row record remain in original order as plaintexts.

(5) to (8) in FIG. 13 illustrate a case where the plaintext of the ciphertext cz indicating a borrow bit is ¼.

In (5), when the plaintext of the ciphertext az of the i-th row data is 0 and the plaintext of the ciphertext bz of the (i−1)th row data is 0, the plaintext of the ciphertext tz obtained in the first step is ½. The plaintext of the ciphertext uz obtained in the second step is ⅝, and the plaintext of (0, ¼)−uz+cz obtained in the third step is ⅞.

The ciphertext az' of the new i-th row data obtained by adding (0, ⅛) to the value obtained by SampleExtract(0) described above is 0. Further, the ciphertext bz' of the new (i−1)th row data obtained by subtracting the value obtained by SampleExtract(n/2) described above from (0, ⅛) is 0.

In this case, the plaintext of the ciphertext az is equal to the plaintext of the ciphertext bz', and the plaintext of the ciphertext bz is equal to the plaintext of the ciphertext az'. When the ciphertexts az and bz are replaced with the new ciphertexts az' and bz', respectively, the i-th row record and the (i−1)th row record are swapped from original order as plaintexts.

Also in (6) to (8), the plaintext of the ciphertext az is equal to the plaintext of the ciphertext bz', and the plaintext of the ciphertext bz is equal to the plaintext of the ciphertext az' as in (5). In (6), for example, the plaintext of the ciphertext az of the i-th row data is 0, the plaintext of the ciphertext bz of the (i−1)th row data is ¼, the plaintext of the ciphertext az' of the new i-th row data is ¼, and the plaintext of the ciphertext bz' of the new (i−1)th row data is 0.

When the ciphertexts az and bz are replaced with the new ciphertexts az' and bz', respectively, the i-th row record and the (i−1)th row record are swapped from the original order as plaintexts.

As described above, the ciphertext az' and the ciphertext bz' become different ciphertexts having the same plaintexts as those of the ciphertexts az and bz or different ciphertexts having the same plaintexts as those of the ciphertexts bz and az, respectively, depending on the plaintext of the ciphertext cz.

Assuming that a decryption function is φ, in a case where φ(cz)=0 (a case where an average age in the (i−1)th row is larger and the order is not swapped), $$\varphi(az')=\varphi(az)$$

$$\varphi(bz')=\varphi(bz)$$

are established.

In a case where φ(cz)=¼ (a case where the average age in the (i−1)th row is smaller and the order is swapped), $$\varphi(az')=\varphi(bz)$$

$$\varphi(bz')=\varphi(az)$$

are established.

In either case, the ciphertext az is not equal to the ciphertext az', the ciphertext bz is not equal to the ciphertext bz', and an original ciphertext and a new ciphertext are different from each other. Ciphertexts themselves are directly handled by the encryption processing device 1, and when the encryption processing device 1 can know whether the ciphertext az' and the ciphertext bz' are the same as the ciphertext az and the ciphertext bz, respectively, or whether the ciphertext az' and the ciphertext bz' are the same as the ciphertext bz and the ciphertext az, respectively, the plaintext of the ciphertext cz can be expected. Therefore, in ciphertexts, an original ciphertext and a new ciphertext must be different from each other. However, each of the plaintext of the ciphertext az' and the plaintext of the ciphertext bz' is either the plaintext of the ciphertext az or the plaintext of the ciphertext bz depending on the plaintext of the ciphertext cz.

Actually, in the stage where the new ciphertexts az' and bz' have been obtained, a process of determining whether to swap the ciphertext az and the ciphertext bz by the ciphertext cz has been completed. Therefore, a process of conditional swap is completed by replacing the ciphertexts az and bz with the new ciphertexts az' and bz', respectively.

The encryption processing device 1 according to the present embodiment uses the same ciphertext cz obtained from the ciphertexts av and by of "average age", for example, which serve as a reference for conditional swap, to obtain the ciphertexts az' and bz' from the ciphertexts az and bz of other fields, such as "address", "total age", and "number of people", which are objects of conditional swap.

The encryption processing device 1 can perform sorting on the entire aggregation result table 80 by replacing the ciphertexts az and bz with the ciphertexts az' and bz' with regard to each column that is an object of conditional swap, such as "address", "total age", and "number of people".

When sorting is performed also with regard to the average age (the ciphertexts av and by) serving as the reference for conditional swap, such sorting can be achieved by obtaining the new ciphertexts av' and bv' by processing identical to that in the case of rearranging the ciphertexts az and bz described above, and replacing the ciphertexts av and by with the ciphertexts av' and bv'.

Figure 14:
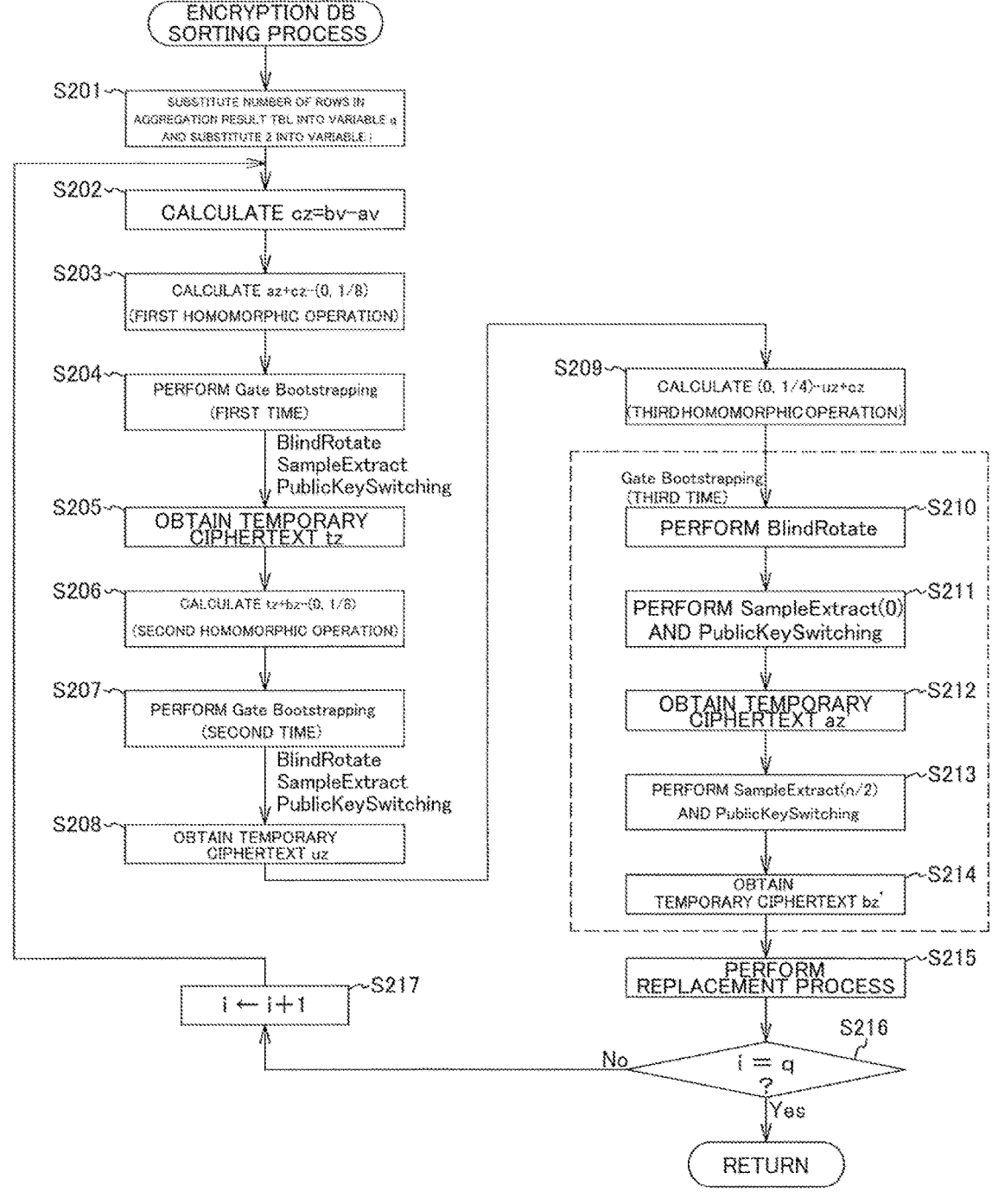
FIG. 14 is a flowchart for explaining a process flow of sorting aggregation results by an encryption processing device.

FIG. 14 is a flowchart for explaining a process flow of sorting aggregation results by an encryption processing device.

The process illustrated in FIG. 14 is performed after the encryption processing device 1 (the aggregation unit 21) performs aggregation on an encrypted database in response to a query for performing aggregation and sorting on the encrypted database.

The encryption processing device 1 substitutes the number of rows (the number of records) in the aggregation result table 80 into a variable q and substitutes 2 into a variable i at Step S201.

The encryption processing device 1 (the comparison unit 22) performs an operation of the ciphertext bv—the ciphertext av to obtain the ciphertext cz of a borrow bit at Step S202.

The comparison unit 22 can causes this operation to be performed by the full adder described above, for example.

The encryption processing device 1 (the first operation unit 12) calculates az+cz–(0, ⅛) at Step S203.

The encryption processing device 1 (the first Bootstrapping unit 15) performs the first Gate Bootstrapping at Step S204 and, as a result, obtains the ciphertext tz at Step S205.

Next, the encryption processing device 1 (the second operation unit 13) calculates tz+bz–(0, ⅛) at Step S206.

The encryption processing device 1 (the second calculation unit 16) performs the second Gate Bootstrapping at Step S207 and, as a result, obtains the ciphertext uz at Step S208.

Next, the encryption processing device 1 (the third operation unit 14) calculates (0, ¼)–uz+cz at Step S209.

Next, the encryption processing device 1 (the third Bootstrapping unit 17) performs the third Gate Bootstrapping at Steps S210 to S214.

The encryption processing device 1 (the third Bootstrapping unit 17) performs BlindRotate at Step S210, performs SampleExtract(0) and key switching at Step S211, and as a result, obtains the ciphertext az' at Step S212.

The encryption processing device 1 (the third Bootstrapping unit 17) performs SampleExtract(n/2) and key switching at Step S213 and, as a result, obtains the ciphertext bz' at Step S214.

At Step S214, the encryption processing device 1 (the replacement unit 23) replaces the ciphertext az with the ciphertext az' and the ciphertext bz with the ciphertext bz' in the aggregation result table 80.

The encryption processing device 1 determines whether i=q is satisfied, that is, a sorting process has been done for all rows at Step S216.

If i=q is not satisfied (No at Step S216), the encryption processing device 1 substitutes i+1 into the variable i to increment the variable i at Step S217 and returns the process to Step S202.

If i=q is satisfied (Yes at Step S216), the encryption processing device 1 ends the sorting process.

Figures 15, 16:
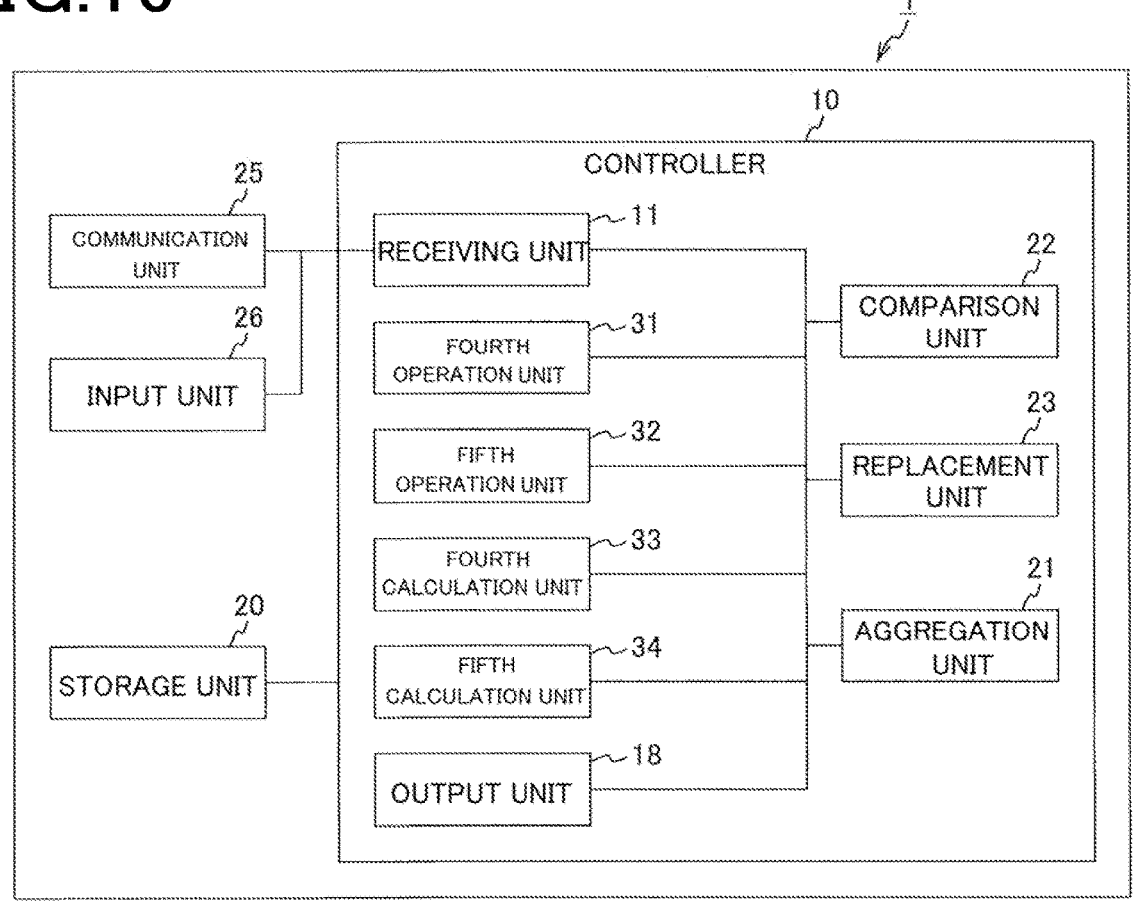
FIG. 15 is a diagram illustrating an example of an aggregation result table after completion of a sorting process.
FIG. 16 is an explanatory diagram of a functional configuration of an encryption processing device according to a modification.

By further repeating the processes in FIG. 14 for the number of rows (the number of records) −1 in the aggregation result table 80, all the records in the aggregation result table 80 are sorted, so that the result illustrated in FIG. 15 can be obtained.

FIG. 15 is a diagram illustrating an example of an aggregation result table after completion of a sorting process.

As a result of performing the processes in FIG. 14 a required number of times, the aggregation result table 80 in FIG. 8 is rearranged as illustrated in FIG. 15. In FIG. 8, the average age for Chiyoda Ward is 40, the average age for Minato Ward is 46.5, and the average age for Taito Ward is 58.

As a result of performing the above-described bubble sort based on these average ages, records in the aggregation result table 80 have been sorted from the highest average age to the lowest average age.

As described above, the encryption processing device 1 according to the present embodiment can reduce the number of times of Gate Bootstrapping to three. Since Gate Bootstrapping occupying almost all the operation time takes a lot of processing time, it is expected that reduction of the number of times of Gate Bootstrapping enables an MUX operation to be performed at high speed in a short time.

However, as illustrated in FIG. 3, the number of stages of Bootstrapping is increased to three although the number of times of Gate Bootstrapping is reduced to three. Therefore, it is not sure that processing by the configuration in FIG. 3 is definitively faster as compared with that in FIG. 1 in a case where multithreading is performed.

In a modification described below, an error of a plaintext of each of the TLWE ciphertexts az, bz, and cz is reduced to, for example, ±¼0 in the encryption processing device 1 of the present embodiment. This configuration enables three binary ciphertexts to be input to the first operation unit 12 in an MUX operation, and reduces the number of times of homomorphic operation processing to two in total by improving Gate Bootstrapping. Consequently, the encryption processing device 1 can reduce the number of times of Gate Bootstrapping that occupies almost all the homomorphic operation processing to two in total. The number of times of homomorphic operation processing can be reduced to two in total while keeping the number of stages of Bootstrapping to two, and the speed of an MUX operation can be increased by 50% as compared with that in FIG. 1 in a case where processing is performed in a multi-threaded manner. Also, an MUX operation can be performed in 66% of the time of the configuration illustrated in FIG. 3.

FIG. 16 is an explanatory diagram of a functional configuration of an encryption processing device according to a modification of the present embodiment.

The encryption processing device 1 includes the controller 10, the storage unit 20, the communication unit 25, and the input unit 26.

The controller 10 includes the receiving unit 11, a fourth operation unit 31, a fifth operation unit 32, a fourth Bootstrapping unit (a fourth calculation unit) 33, a fifth Bootstrapping unit (a fifth calculation unit) 34, and the output unit 18. The controller 10 also includes the aggregation unit 21, the comparison unit 22, and the replacement unit 23.

The rest of the configuration other than the fourth operation unit 31, the fifth operation unit 32, the fourth Bootstrapping unit 33, and the fifth Bootstrapping unit 34 in FIG. 16 is identical to that in FIG. 2, and the description thereof is omitted.

The fourth operation unit 31 performs a fourth homomorphic operation for an input ciphertext received by the receiving unit 11.

The fifth operation unit 32 performs a fifth homomorphic operation for a ciphertext output from the fourth Bootstrapping unit 33.

The fourth Bootstrapping unit 33 performs a Gate Bootstrapping process, which will be descried below, for the result of the operation by the fourth operation unit 31 and outputs a new ciphertext.

The fifth Bootstrapping unit 34 performs the Gate Bootstrapping process, which will be descried below, for the result of the operation by the fifth operation unit 32 and outputs a new ciphertext.

Figure 17:
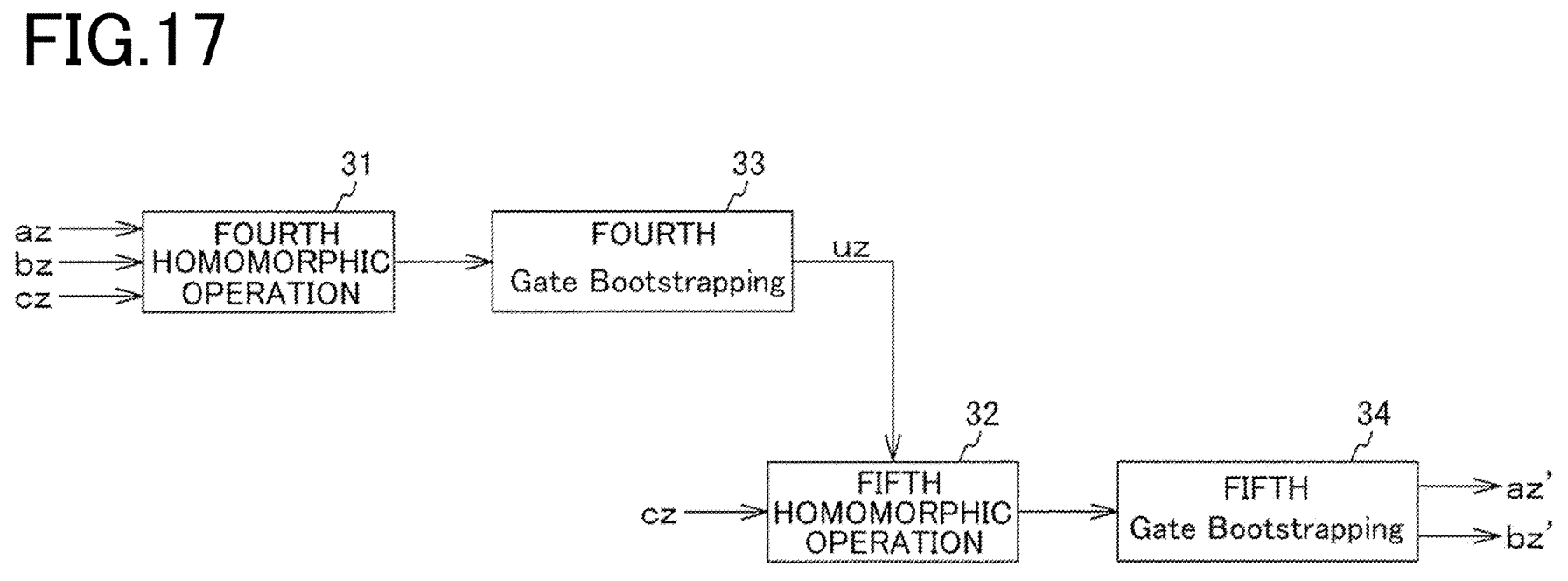

FIG. 17 is a more detailed explanatory diagram of an operation process by an encryption processing device according to the modification.

In the description of FIG. 17, all of the ciphertexts az, bz, and cz input to the encryption processing device 1 are the TLWE ciphertexts described in the aforementioned paper. TLWE encryption is Bit-wise type fully homomorphic encryption that has 0 or a value μ (non-0) as a plaintext.

Various operations can be performed by logical operations using logic gates.

A TLWE ciphertext has two values as a plaintext, each value being obtained by adding an error with a predetermined variance to a predetermined value corresponding to a binary symbol 0 or 1. The TLWE ciphertext can be subjected to a logical operation without being decrypted.

These ciphertexts are TLWE ciphertexts by specifically set system parameters, and are created by Gate Bootstrapping or are newly encrypted.

The TLWE ciphertexts az, bz, and cz each have 0 or $\frac{1}{4}$ as a plaintext, and an error added to the plaintext falls within a range of $\pm\frac{1}{40}$.

As for each of the TLWE ciphertexts az, bz, and cz, 0 corresponds to a binary symbol 0, and $\frac{1}{4}$ corresponds to a symbol 1.

By employing a configuration having two values and three inputs, there is a possibility that error ranges overlap each other. Therefore, the error to be added to the plaintext is set to be smaller than $\pm\frac{1}{16}$ in the aforementioned paper, i.e., within $\pm\frac{1}{40}$.

However, as will be described later, the error is not limited thereto when a problem due to overlapping of errors is allowable, and $\pm\frac{1}{40}$ in the embodiment or $\pm\frac{1}{16}$ in the aforementioned paper may be adopted as the error.

The configuration illustrated in FIG. 17 uses (binary) Gate Bootstrapping presented in "TFHE: Fast Fully Homomorphic Encryption over the Torus. Journal of Cryptology, 33:34-91, 2020, I. Chillotti, N. Gama, M. Georgieva, and M. Izabachene" (the aforementioned paper).

The input ciphertexts az, bz, and cz are input to the fourth operation unit 31 and subjected to a homomorphic operation $(2\times(az+cz)+bz-(0, \frac{1}{8}))$, and a ciphertext as the operation result is input to the fourth Bootstrapping unit 33 that performs binary Gate Bootstrapping.

The output of the fourth Bootstrapping unit 33 is the temporary ciphertext uz that can have either one of two values $(0, \mu)$ as a plaintext.

The ciphertext uz and the ciphertext cz are input to the fifth operation unit 32 and subjected to a homomorphic operation $((0, \frac{1}{4})-uz+cz)$, and its output result is input to the fifth Bootstrapping unit 34 and subjected to binary Gate Bootstrapping. Consequently, the new ciphertext az' and the new ciphertext bz' are output.

Processing by the fifth operation unit 32 and the fifth Bootstrapping unit 34 is the same as that by the third operation unit 14 and the third Bootstrapping unit 17 described above.

The encryption processing device 1 (the fourth operation unit 31) calculates $2(az+cz)+bz-(0, \frac{1}{8})$ to obtain the TLWE ciphertext ct as the operation result. $(0, \frac{1}{8})$ is a trivial TLWE ciphertext whose plaintext is $\frac{1}{8}$.

A plaintext of the result of the operation $2(az+cz)+bz-(0, \frac{1}{8})$ is as follows.

When az is 0, bz is 0, and cz is 0 $(2(az+cz)+bz$ is represented by binary symbols as $2\times(0+0)+0=0)$, $$2\times(0+0)+0-\frac{1}{8}=-\frac{1}{8}(\frac{7}{8}).$$

When az is 0, bz is 0, and cz is $\frac{1}{4}$ $(2(az+cz)+bz$ is represented by binary symbols as $2\times(0+1)+0=2)$, $$2\times(0+\frac{1}{4})+0-\frac{1}{8}=\frac{3}{8}.$$

When az is 0, bz is $\frac{1}{4}$, and cz is 0 $(2(az+cz)+bz$ is represented by binary symbols as $2\times(0+0)+1=1)$, $$2\times(0+0)+\frac{1}{4}-\frac{1}{8}=\frac{1}{8}.$$

When az is 0, bz is $\frac{1}{4}$, and cz is $\frac{1}{4}$ $(2(az+cz)+bz$ is represented by binary symbols as $2\times(0+1)+1=3)$, $$2\times(0+\frac{1}{4})+\frac{1}{4}-\frac{1}{8}=\frac{5}{8}.$$

When az is $\frac{1}{4}$, bz is 0, and cz is 0 $(2(az+cz)+bz$ is represented by binary symbols as $2\times(1+0)+0=2)$, $$2(\frac{1}{4}+0)+0-\frac{1}{8}=\frac{3}{8}.$$

When az is $\frac{1}{4}$, bz is 0, and cz is $\frac{1}{4}$ $(2(az+cz)+bz$ is represented by binary symbols as $2\times(1+1)+0=4)$, $$2(\frac{1}{4}+\frac{1}{4})+0-\frac{1}{8}=-\frac{1}{8}(\frac{7}{8}).$$

When az is $\frac{1}{4}$, bz is $\frac{1}{4}$, and cz is 0 $(2(az+cz)+bz$ is represented by binary symbols as $2\times(1+0)+1=3)$, $$2(\frac{1}{4}+0)+\frac{1}{4}-\frac{1}{8}=\frac{5}{8}.$$

When az is $\frac{1}{4}$, bz is $\frac{1}{4}$, and cz is $\frac{1}{4}$ $(2(az+cz)+bz$ is represented by binary symbols as $2\times(1+1)+1=5)$, $$2(\frac{1}{4}+\frac{1}{4})+\frac{1}{4}-\frac{1}{8}=\frac{9}{8}\Rightarrow\frac{1}{8}.$$

The TLWE ciphertext ct has any of four values including $\frac{1}{8}$, $\frac{3}{8}$, $\frac{5}{8}$, and $\frac{7}{8}$ as its plaintext, and an error added to the plaintext falls within a range of $\pm\frac{1}{8}$.

This is because an error of az+cz, i.e., (the sum of $\pm\frac{1}{40})\times2$ and an error of bz, i.e., $\pm\frac{1}{40}$ are added together.

Next, when the encryption processing device 1 (the fourth Bootstrapping unit) 33 performs Gate Bootstrapping as described in the aforementioned paper for the TLWE ciphertext ct, the temporary ciphertext uz is obtained which has $\frac{1}{8}$, $\frac{3}{8}$, $\frac{5}{8}$, and $\frac{7}{8}$ as its plaintext and in which an error of the plaintext is $\pm\frac{1}{40}$, the ciphertext uz being is the same as that calculated in the above-described [second step].

Since the subsequent processing using the temporary ciphertext uz and the ciphertext cz is the same as that in the [third step] described above, the description thereof is omitted.

Figure 18:
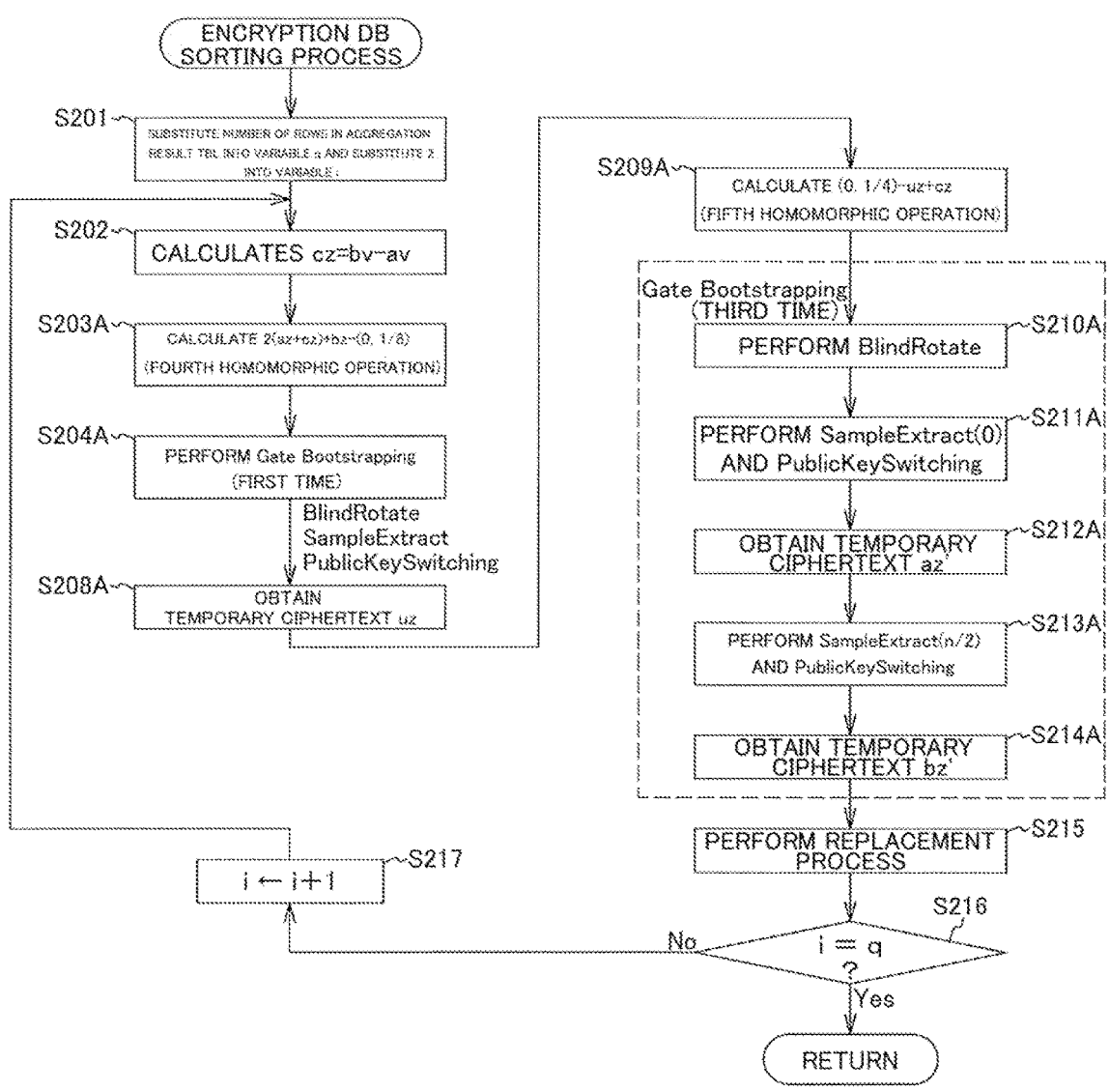
FIG. 18 is a flowchart for explaining a process flow of sorting aggregation results according to the modification.

FIG. 18 is a flowchart for explaining a process flow of sorting aggregation results according to the modification.

The processing illustrated in FIG. 18 is performed after the encryption processing device 1 (the aggregation unit 21) performs aggregation on an encrypted database in response to a query for performing aggregation and sorting on the encrypted database.

The encryption processing device 1 substitutes the number of rows (the number of records) in the aggregation result table 80 into a variable q and substitutes 2 into a variable i at Step S201.

The encryption processing device 1 (the comparison unit 22) performs an operation of the ciphertext bv—the ciphertext av to obtain the ciphertext cz of a borrow bit at Step S202.

The comparison unit 22 can causes this operation to be performed by the full adder described above, for example. The encryption processing device 1 (the fourth operation unit 31) calculates $2(az+cz)+bz-(0, \frac{1}{8})$ at Step S203A.

The encryption processing device 1 (the fourth Bootstrapping unit 33) performs the first Gate Bootstrapping at Step S204A and, as a result, obtains the ciphertext uz at Step S208A. This ciphertext uz is the same as the ciphertext uz obtained at Step S208 in FIG. 14 except for an error added to a plaintext.

Next, the encryption processing device 1 (the fifth operation unit 32) calculates $(0, \frac{1}{4})-uz+cz$ at Step S209A.

Next, the encryption processing device 1 (the fifth Bootstrapping unit 34) performs the third Gate Bootstrapping at Steps S210A to S214A.

The encryption processing device 1 (the fifth Bootstrapping unit 34) performs BlindRotate at Step S210A, performs SampleExtract(0) and key switching at Step S211A and, as a result, obtains the ciphertext az' at Step S212B.

The encryption processing device 1 (the fifth Bootstrapping unit 34) performs SampleExtract(n/2) and key switching at Step S213A and, as a result, obtains the ciphertext bz' at Step S214A.

The processes at Steps S210A to S214A by the fifth Bootstrapping unit 34 are the same as those at Steps S210 to S214 by the third Bootstrapping unit 17 illustrated in FIG. 14.

At Step S214, the encryption processing device 1 (the replacement unit 23) replaces the ciphertext az with the ciphertext az' and the ciphertext bz with the ciphertext bz' in the aggregation result table 80.

The encryption processing device 1 determines whether i=q is satisfied, that is, a sorting process has been done for all rows at Step S216.

If i=q is not satisfied (No at Step S216), the encryption processing device 1 substitutes i+1 into the variable i to increment the variable i at Step S217 and returns the process to Step S202.

If i=q is satisfied (Yes at Step S216), the encryption processing device 1 ends the sorting process.

By further repeating the processes in FIG. 14 for the number of rows (the number of records) −1 in the aggregation result table 80, all the records in the aggregation result table 80 can be sorted, so that the result as illustrated in FIG. 15 is obtained.

Figures 19A, 19B:
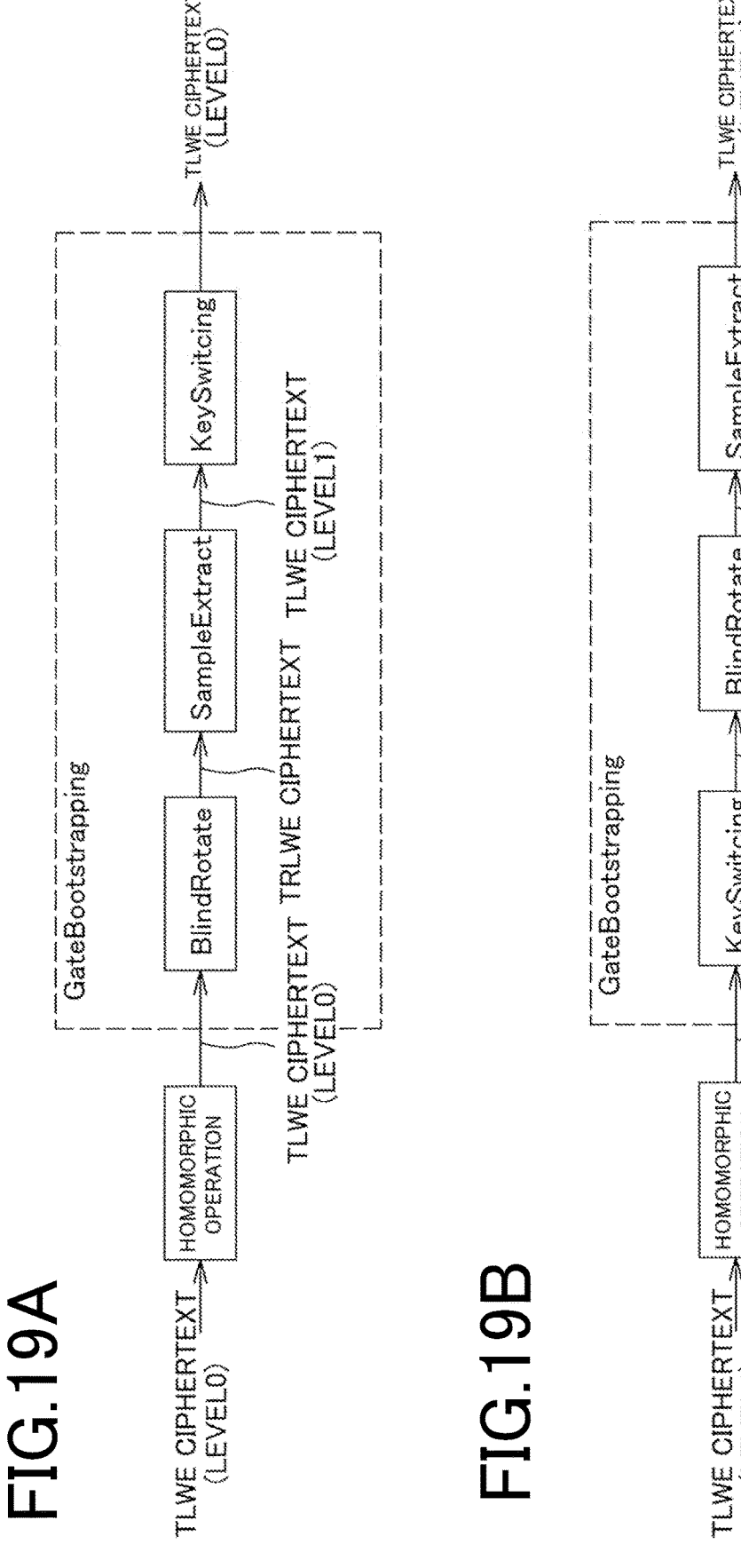
FIG. 19A and 19B are diagrams illustrating ciphertexts input to and output from Gate Bootstrapping according to the present embodiment.

FIG. 19A and 19B are diagrams illustrating ciphertexts input to and output from Gate Bootstrapping according to the present embodiment.

In the above descriptions, Gate Bootstrapping has been described as being performed in the order of BlindRotate, SampleExtract, and key switching, as illustrated in FIG. 19A.

The order is not limited thereto. In Gate Bootstrapping, key switching is performed first, and thereafter BlindRotate and SampleExtract can be performed, as illustrated in FIG. 19B.

As for TLWE ciphertexts, there is a concept of levels depending on security strengths.

In Gate Bootstrapping in FIG. 19A, TLWE ciphertexts as input and output are at LEVEL0. A TLWE ciphertext obtained by performing BlindRotate for a LEVEL0 TLWE ciphertext and performing SampleExtract for a TRLWE ciphertext as the output of BlindRotate is at LEVEL1 However, as a result of key switching, a LEVEL0 TLWE ciphertext is output.

Meanwhile, in the method illustrated in FIG. 19B, TLWE ciphertexts as input and output of the Gate Bootstrapping are set to LEVEL1, and key switching is first performed to lower the level of the ciphertext to LEVEL0. In this state, BlindRotate is performed. When SampleExtract is performed for the TRLWE ciphertext as the output of BlindRotate, the LEVEL1 TLWE ciphertext is output.

A LEVEL0 ciphertext is formed by an N-th order vector [a] of elements on the circle group {T} encrypted with an N-th order private key [s]. Meanwhile, a LEVEL1 ciphertext obtained as a result of SampleExtract is formed by an n-th order vector [a'] of elements on the circle group {T} encrypted with an n-th order private key [s'].

In the LEVEL0 ciphertext, the number of coefficients (the degree of a vector) serving as difficulty of the LWE problem is smaller than that of the LEVEL1 ciphertext, and thus the computation complexity of homomorphic addition is smaller than that of the LEVEL1 ciphertext.

On the other hand, the LEVEL0 ciphertext has a problem that the security strength tends to decrease when an allowable error added to a plaintext is made small in order to enable a homomorphic operation using three binary inputs as in the above-described modification. This is because in LWE encryption, the security is ensured by an error added to a plaintext.

In TLWE encryption, calculation (decryption) is more difficult as an error added to a plaintext is larger and the number of coefficients (the degree of a vector) is larger.

In other words, the smaller the error added to the plaintext is and the smaller the number of coefficients (the degree of a vector) is, the easier the calculation (decryption) of the TLWE encryption is.

In order to make the error smaller, it is necessary to ensure security by increasing the number of coefficients (the degree of a vector) of the ciphertext.

In the modification, the error to be added to the plaintext is reduced to $\pm\frac{1}{40}$, whereby the number of times of BlindRotate is reduced by a homomorphic operation using three binary inputs, and an MUX operation is speeded up. In order to ensure the security of the ciphertext that is easy to calculate (decrypt) by reducing the error added to the plaintext, it is desirable to move key switching to the top of Gate Bootstrapping and to use the LEVEL1 ciphertext, which has a large number of coefficients (the degree of a vector) and is easy to make an error range smaller, as input and output of Gate Bootstrapping. Then, after the LEVEL0 ciphertext is converted at the beginning of Gate Bootstrapping, the level is not returned to LEVEL0 at the end.

The time required for BlindRotate is proportional to the number of coefficients (the order of a vector) of the input TLWE ciphertext. Therefore, when the LEVEL1 ciphertext is input, the time required for BlindRotate becomes longer in proportion to the number of coefficients (the degree of a vector) than when the LEVEL0 ciphertext is input.

Even if the LEVEL1 ciphertext is input to Gate Bootstrapping in order to ensure the security of the ciphertext, it is possible to avoid increase in the required time by performing BlindRotate using the LEVEL0 TLWE ciphertext converted by key switching as input.

The method of using LEVEL1 TLWE ciphertexts as input and output of the Gate Bootstrapping is not limited to the case of performing a homomorphic operation using three binary inputs as in the modification, and can also be applied to a case of a homomorphic operation using two binary inputs in FIG. 3. By not returning the level to the LEVEL0, it is possible to safely perform multi-valued input and perform processing at high speed also in the calculation of the TLWE ciphertext in the next stage.

Further, setting an error to be added to a plaintext to $\pm\frac{1}{40}$ or the like has a problem of an error at the time of decryption in addition to the above-described security strength.

In the configuration of the present embodiment, BlindRotate, which occupies most of the processing time of Gate Bootstrapping, can be completed in one time. However, since it is necessary to make the error range smaller, this configuration also has a problem that the security strength decreases and a problem that the decoding error rate increases.

In LWE homomorphic encryption including TFHE, errors added to plaintexts are distributed in a normal distribution, and it is not possible to strictly set an "error range".

Although there is no change in the concentration around 0, in principle, it is only possible to concentrate more errors in a specified range.

For example, even if the error to be added to the plaintext is set within $\pm\frac{1}{40}$, there is a possibility that an error outside the range is added in several percent.

When the error is out of the set range, the corresponding plaintext is interpreted as another plaintext, and thus an unexpected calculation result may be obtained.

The calculation itself does not become impossible, but only a different result is obtained. How much probability that a different calculation result is obtained is acceptable depends on an application to which homomorphic encryption is applied.

In the present embodiment, by changing system parameters to set errors to be added to plaintexts to ±¹⁄₄₀, it is possible to achieve three objectives of reducing the probability of occurrence of an error in calculation, speeding up calculation by reducing the number of times of BlindRotate, and maintaining high security in a well-balanced manner.

It is necessary to set the system parameters in such a manner that errors are set with overlap of the error ranges falling within a fixed value in order to best balance these objects.

The error may be set so as to satisfy a particularly important condition in accordance with a system or device to which the present embodiment is applied. When emphasis is placed on increasing the speed of operation, homomorphic operation such as four binary inputs can be performed by setting an error to be added to a plaintext within a range of ±¹⁄₃₂.

In an application in which a possibility that a different calculation result is obtained can be allowed to some extent, security can be maintained by setting an error within ±¹⁄₁₆ while allowing a possibility that error ranges overlap to some extent and speeding up calculation by using three binary inputs.

For example, even if the parameters of the above-mentioned paper in which an error to be added to a plaintext is set within ±¹⁄₁₆ are used, the configuration of the present embodiment that speeds up a full adder by a homomorphic operation using three binary inputs is possible in principle. A probability that an error is out of the set range and a different calculation result is obtained is increased.

Figure 20:
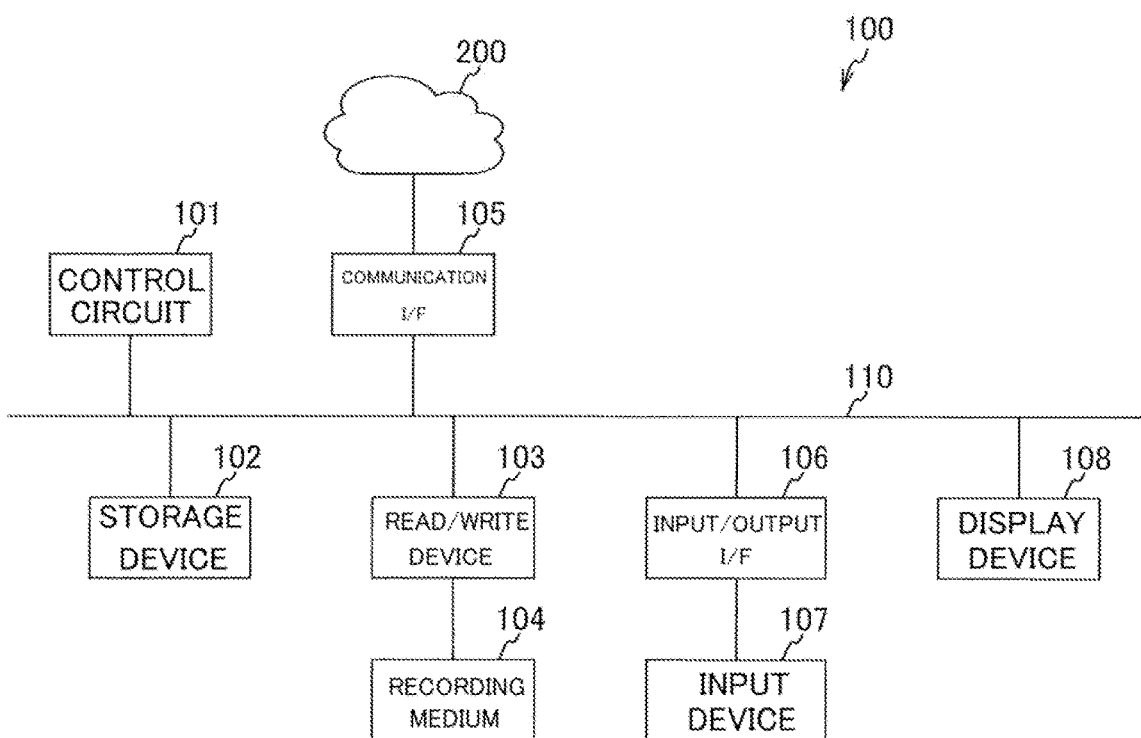
FIG. 20 is a block diagram illustrating an example of a computer apparatus.

FIG. 20 is a block diagram illustrating an example of a computer apparatus.

The configuration of a computer apparatus 100 is described with reference to FIG. 20.

The computer apparatus 100 is, for example, an encryption processing device that processes various types of information. The computer apparatus 100 includes a control circuit 101, a storage device 102, a read/write device 103, a recording medium 104, a communication interface 105, an input/output interface 106, an input device 107, and a display device 108. The communication interface 105 is connected to a network 200. The respective constituent elements are mutually connected to one another via a bus 110.

The encryption processing device 1 can be configured by a part or all elements which are selected from the constituent elements described in the computer apparatus 100 as appropriate.

The control circuit 101 controls the entire computer apparatus 100. For example, the control circuit 101 is a processor such as a Central Processing Unit (CPU), a Field Programmable Gate Array (FPGA), an Application Specific Integrated Circuit (ASIC), and a Programmable Logic Device (PLD). The control circuit 101 functions as the controller 10 in FIGS. 2 and 16, for example.

The storage device 102 stores various types of data therein. For example, the storage device 102 is a non-transitory computer-readable recording medium such as a memory such as a Read Only Memory (ROM) and a Random Access Memory (RAM), or a hard disk (HD) and a Solid State Drive (SSD). The storage device 102 may store therein an information processing program that causes the control circuit 101 to function as the controller 10 in FIGS. 2 and 16. The storage device 102 functions as the storage unit 20 in FIGS. 2 and 16, for example.

The encryption processing device 1 loads a program stored in the storage device 102 into a RAM when performing information processing.

The encryption processing device 1 executes the program loaded to the RAM by the control circuit 101, thereby performing processing that includes at least one of a receiving process, a first operation process, a second operation process, a third operation process, a fourth operation process, a fifth operation process, a first Bootstrapping process, a second Bootstrapping process, a third Bootstrapping process, a fourth Bootstrapping process, a fifth Bootstrapping process, an output process, a comparison process, an aggregation process, and a replacement process.

The program may be stored in a storage device included in a server on the network 200, as long as the control circuit 101 can access that program via the communication interface 105.

The read/write device 103 is controlled by the control circuit 101, and reads data in the removable recording medium 104 and writes data to the removable recording medium 104.

The recording medium 104 stores various types of data therein. The recording medium 104 stores information processing program therein, for example. For example, the recording medium 104 is a non-volatile memory (non-transitory computer-readable recording medium) such as a Secure Digital (SD) memory card, a Floppy Disk (FD), a Compact Disc (CD), a Digital Versatile Disk (DVD), a Blu-ray (registered trademark) Disk (BD), and a flash memory.

The communication interface 105 connects the computer apparatus 100 and another device to each other via the network 200 in a communicable manner. The communication interface 105 functions as the communication unit 25 in FIGS. 2 and 16, for example.

The input/output interface 106 is, for example, an interface that can be connected to various types of input devices in a removable manner. Examples of the input device 107 connected to the input/output interface 106 include a keyboard and a mouse. The input/output interface 106 connects each of the various types of input devices connected thereto and the computer apparatus 100 to each other in a communicable manner. The input/output interface 106 outputs a signal input from each of the various types of input devices connected thereto to the control circuit 101 via the bus 110. The input/output interface 106 also outputs a signal output from the control circuit 101 to an input/output device via the bus 110. The input/output interface 106 functions as the input unit 26 in FIGS. 2 and 16, for example.

The display device 108 displays various types of information. The network 200 is, for example, a LAN, wireless communication, a P2P network, or the Internet and communicably connects the computer apparatus 100 to other devices.

The present embodiment is not limited to the embodiment described above and various configurations or embodiments can be applied within a scope not departing from the gist of the present embodiment.

All examples and condition statements aided herein are intended for educational purposes to help the reader understand the concepts contributed by the inventor to further the invention and the art, and are to be construed as not limited to such specifically aided examples and conditions, and the construction of such examples is not relevant to depicting the superiority of the invention. While embodiments of the invention have been described in detail, it is to be understood that various changes, substitutions, and modifications may be made herein without departing from the spirit and scope of the invention.

The invention claimed is:

1. An encryption processing device that processes a ciphertext, the device comprising:

a storage unit configured to store the ciphertext, wherein the ciphertext has two values as a plaintext and is a ciphertext of fully homomorphic encryption that allows a logical operation without decryption, each of the two values being obtained by adding an error having a predetermined variance to a predetermined value corresponding to a symbol 0 or 1; and a processor operatively coupled to the storage unit, the processor configured to execute a process including:

performing an encryption processing process in which new ciphertexts respectively corresponding to a plaintext of a first ciphertext and a plaintext of a second ciphertext arranged in a predetermined order are capable of being obtained in a same order as or in a reverse order to the predetermined order, and an order of the new ciphertexts is selected based on a plaintext of a third ciphertext, reducing the number of calculations required for the encryption processing process by using a multi-value logical operation outputting a temporary ciphertext that is based on the ciphertext and has multiple values more than two values as a plaintext; and causing the new ciphertexts to be stored in the storage unit.

2. The encryption processing device according to claim 1, wherein number of operations by a polynomial when the multi-value logical operation is performed using the ciphertext is reduced by setting the error in such a manner that an overlap of errors falls within a predetermined value.

3. The encryption processing device according to claim 1, wherein the processor executes a process including:

performing a homomorphic operation involved in a predetermined operation, for the ciphertext input thereto; and calculating a new ciphertext using a predetermined polynomial for a result of the homomorphic operation, and reducing number of coefficients of the ciphertext before calculation of the new ciphertext using the predetermined polynomial for the result of the homomorphic operation.

4. The encryption processing device according to claim 1, wherein bubble sort is carried out by performing the process.

5. The encryption processing device according to claim 1, wherein ciphertexts to be swapped are values stored in an aggregation table to which values stored in an encrypted database are aggregated, the values stored in the encrypted database include a plurality of reference values used as a reference for aggregation and values associated with the respective reference values, the aggregation table includes the plurality of reference values and results of aggregation of values associated with the respective reference values in the encrypted database, aggregation on the encrypted database is performed by aggregating, based on a result of comparison between the reference value for aggregation included in the aggregation table and the reference value included in the encrypted database, a value in the encrypted database corresponding to the reference value for aggregation in association with the reference value for aggregation in the aggregation table, and the process is performed for the aggregation table after aggregation.

6. The encryption processing device according to claim 5, wherein the reference values and the reference values for aggregation are each formed by a multi-bit value, the comparison is performed by aggregating a result of bit-by-bit comparison between one of the reference values and one of the reference values for aggregation, and the aggregation on the encrypted database is performed by adding a value based on a result of the comparison and a value corresponding to the reference value to a corresponding total value in the aggregation table.

7. An encryption processing method that processes a ciphertext and is performed by a processor, wherein the ciphertext has two values as a plaintext and is a ciphertext of fully homomorphic encryption that allows a logical operation without decryption, each of the two values being obtained by adding an error having a predetermined variance to a predetermined value corresponding to a symbol 0 or 1, wherein the encryption processing method includes:

performing an encryption processing process in which new ciphertexts respectively corresponding to a plaintext of a first ciphertext and a plaintext of a second ciphertext arranged in a predetermined order are able to be obtained in a same order as or in a reverse order to the predetermined order, and an order of the new ciphertexts can be selected based on a plaintext of a third ciphertext, and reducing number of calculations required for the process by using a multi-value logical operation outputting a temporary ciphertext that is based on the ciphertext and has multiple values more than two values as a plaintext.

8. A non-transitory computer-readable recording medium storing therein a program for causing a processor to perform an encryption processing method that processes a ciphertext, wherein the ciphertext has two values as a plaintext and is a ciphertext of fully homomorphic encryption that allows a logical operation without decryption, each of the two values being obtained by adding an error having a predetermined variance to a predetermined value corresponding to a symbol 0 or 1, the encryption processing method includes:

performing an encryption processing process in which new ciphertexts respectively corresponding to a plaintext of a first ciphertext and a plaintext of a second ciphertext arranged in a predetermined order are able to be obtained in a same order as or in a reverse order to the predetermined order, and an order of the new ciphertexts can be selected based on a plaintext of a third ciphertext, and reducing number of calculations required for the process by using a multi-value logical operation outputting a temporary ciphertext that is based on the ciphertext and has multiple values more than two values as a plaintext.

* * * * *